(12) United States Patent
Ishikawa

(10) Patent No.: US 9,105,306 B2
(45) Date of Patent: Aug. 11, 2015

(54) IDENTIFYING OBJECTS IN IMAGES USING OBJECT IDENTITY PROBABILITIES BASED ON INTERFRAME DISTANCES

(75) Inventor: Masumi Ishikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1328 days.

(21) Appl. No.: 12/521,698

(22) PCT Filed: Dec. 25, 2007

(86) PCT No.: PCT/JP2007/074817
§ 371 (c)(1), (2), (4) Date: Jun. 29, 2009

(87) PCT Pub. No.: WO2008/078736
PCT Pub. Date: Jul. 3, 2008

(65) Prior Publication Data
US 2010/0150408 A1    Jun. 17, 2010

(30) Foreign Application Priority Data

Dec. 27, 2006  (JP) .................................. 2006-351892
Nov. 15, 2007  (JP) .................................. 2007-296718

(51) Int. Cl.
| | |
|---|---|
| G06K 9/00 | (2006.01) |
| G11B 27/28 | (2006.01) |
| G06K 9/32 | (2006.01) |
| G06T 7/00 | (2006.01) |
| H04H 60/37 | (2008.01) |
| H04H 60/48 | (2008.01) |

(Continued)

(52) U.S. Cl.
CPC ............ *G11B 27/28* (2013.01); *G06K 9/00288* (2013.01); *G06K 9/00718* (2013.01); *G06K 9/32* (2013.01); *G06T 7/0028* (2013.01); *H04H 60/37* (2013.01); *H04H 60/48* (2013.01); *H04H 60/59* (2013.01); *H04N 5/147* (2013.01); *H04N 5/765* (2013.01); *G06T 2207/10016* (2013.01); *G06T 2207/20064* (2013.01); *G06T 2207/20076* (2013.01); *G11B 2220/2516* (2013.01)

(58) Field of Classification Search
None
See application file for complete search history.

(56) References Cited

U.S. PATENT DOCUMENTS 5,920,650 A * 7/1999 Kazui et al. .................... 382/233
6,498,863 B1 * 12/2002 Gaidoukevitch et al. ..... 382/173

(Continued)

FOREIGN PATENT DOCUMENTS

| JP | 07-193748 | 7/1995 |
|---|---|---|
| JP | 8-506947 | 7/1996 |

(Continued)

OTHER PUBLICATIONS

Machine text translation of JP2007-303239 specification, PAJ (Patent Abstract of Japan), Feb. 2013, pp. 1-16.*

(Continued)

*Primary Examiner* — Jayesh A Patel
(74) *Attorney, Agent, or Firm* — Scully, Scott, Murphy & Presser, P.C.

(57) ABSTRACT

The invention makes it possible to determine whether or not objects appearing in various temporal positions in an input video are identical to each other. Identity between a plurality of objects detected from an input video is determined by using an object identity probability determined based on an interframe distance, the interframe distance being a distance between frames from which the respective objects are detected.

61 Claims, 19 Drawing Sheets

(51) Int. Cl.
*H04H 60/59* (2008.01)
*H04N 5/14* (2006.01)
*H04N 5/765* (2006.01)

(56) References Cited

U.S. PATENT DOCUMENTS

| | | | | |
|---|---|---|---|---|
| 6,542,625 | B1* | 4/2003 | Lee et al. | 382/118 |
| 6,774,917 | B1* | 8/2004 | Foote et al. | 715/700 |
| 6,985,172 | B1* | 1/2006 | Rigney et al. | 348/149 |
| 6,990,489 | B2* | 1/2006 | Kondo et al. | 1/1 |
| 7,636,630 | B2* | 12/2009 | Fushiki et al. | 701/423 |
| 7,688,349 | B2* | 3/2010 | Flickner et al. | 348/150 |
| 2004/0151250 | A1* | 8/2004 | Witterbrood et al. | 375/240.16 |
| 2004/0208246 | A1* | 10/2004 | Conklin | 375/240.16 |
| 2004/0223652 | A1* | 11/2004 | Cetin et al. | 382/235 |
| 2004/0258397 | A1* | 12/2004 | Kim | 386/94 |
| 2005/0084017 | A1* | 4/2005 | Seo | 375/240.24 |
| 2005/0286738 | A1* | 12/2005 | Sigal et al. | 382/103 |
| 2007/0103387 | A1* | 5/2007 | Kondo et al. | 345/1.2 |
| 2007/0146320 | A1* | 6/2007 | Kubota | 345/157 |

FOREIGN PATENT DOCUMENTS

| | | |
|---|---|---|
| JP | 10-234004 | 9/1998 |
| JP | 2000-285242 | 10/2000 |
| JP | 2000-322450 | 11/2000 |
| JP | 2001-350494 | 12/2001 |
| JP | 2004-234536 | 8/2004 |
| JP | 2005-258570 | 9/2005 |
| JP | 2006-039978 | 2/2006 |
| JP | 2007-303239 | 11/2007 |

OTHER PUBLICATIONS

Prediction and tracking—Image sequences, Bors et al., IEEE, 1057-7149, 2000, pp. 1441-1445.*

A Detection-Based—Tracking method, Han et al., IEEE, 0-7803-8554-3, 2004, pp. 3065-3068.*

Notice of Reasons for Rejection dated Jun. 6, 2012 received from the Japanese Patent Office from related Japanese Application No. 2008-551112, together with an English-language translation.

Hotta, Seiji et al., "Kong Bunpu Hyogen ni Motozuku Video no Ruiji Kensaku", Image Lab (Oct. 1, 2002), vol. 13, No. 10, pp. 6-9.

Iwai, Yoshio et al., "A Survey on Face Detection and Face Recognition", Information Processing Society of Japan SIG. notes (CVIM-149) (2005), pp. 343-368.

Akamatsu, Shigeru, "Computer recognition of human face—A survey—", The Institute of Electronics, Information, and Communication Engineers Transactions vol. J80-A, No. 8, pp. 1215-1230, Aug. 1997.

Abstract of PCT Publication No. WO 94/19912, dated Sep. 1, 1994.

* cited by examiner

FIGURE 26

| GROUP ID | FRAME NUMBER | OBJECT ID |
|---|---|---|
| 1 | fc | C |
|  | fd | D |
|  | ⋮ | ⋮ |
| 2 | fa | A |
|  | ⋮ | ⋮ |
| ⋮ | ⋮ | ⋮ |

FIGURE 27

| INTERFRAME DISTANCE | OBJECT IDENTITY PROBABILITY |
|---|---|
| D | R |
| ⋮ | ⋮ |
| D' | R |
| D | R |
| ⋮ | ⋮ |

FIGURE 28

| GROUP ID | FRAME NUMBER | OBJECT ID | IMAGE DATA |
|---|---|---|---|
| 1 | fc | C | 😊 |
|  | fd | D | 😊 |
|  | ⋮ | ⋮ |  |
| 2 | fa | A | 😊 |
|  | ⋮ | ⋮ |  |
| ⋮ | ⋮ | ⋮ |  |

IDENTIFYING OBJECTS IN IMAGES USING OBJECT IDENTITY PROBABILITIES BASED ON INTERFRAME DISTANCES

TECHNICAL FIELD

The present application is based on Japanese Patent Application No. 2006-351892 (filed on Dec. 27, 2006) and Japanese Patent Application No. 2007-296718 (filed on Nov. 15, 2007), and claims a priority according to the Paris Convention based on the Japanese Patent Application No. 2006-351892 and the Japanese Patent Application No. 2007-296718. Disclosed contents of the Japanese Patent Application No. 2006-351892 and the Japanese Patent Application No. 2007-296718 are incorporated in the specification of the present application by reference to the Japanese Patent Application No. 2006-351892 and the Japanese Patent Application No. 2007-296718.

BACKGROUND ART

Patent Literature 1 describes an example of a conventional identity determination system.

The technique of Patent Literature 1 is to group objects detected from video frames based on the similarity between the objects, and create a list of the appearing objects based on the numbers of appearance of the objects constituting the respective groups. For example, human faces extracted from a video are grouped to create a list of performers based on the numbers of appearing faces in the respective groups.

FIG. 1 shows the configuration for that purpose, which includes: a still image extracting unit 700 for extracting an input video as a plurality of still images; an image dividing unit 701 for dividing the still images into shots which consist of arbitrary numbers of still images; a predetermined video determining unit 702 for determining whether or not each shot includes a predetermined video; a predetermined video precedent determining unit 703 for determining whether or not predetermined videos have been previously included in the input video; a predetermined video classifying and measuring unit 704 for performing grouping based on the similarity of the predetermined videos, and measuring the numbers of appearance of the predetermined videos; and a video appearance list creating unit 705 for creating a video appearance list based on the numbers of appearances.

Patent Literature 2 describes another example of an identity determination system.

The technique of Patent Literature 2 is to group segments that constitute an input signal, such as videos and sound, into combinations of segments having the same semantic signal structures if features extracted from the segments have high similarity therebetween and the segments are at a temporal distance smaller than or equal to a predetermined threshold. For example, in a conversation scene with two speakers, segments that appear alternately for the respective speakers are grouped by speaker.

FIG. 2 shows the structure for that purpose, which includes: a video feature extraction unit 801 that extracts video features from segments consisting of certain consecutive frames, and a sound feature extraction unit 802 that extracts sound features; a feature similarity measuring unit 805 that measures a pair of segments for similarity; and a scene detection unit 806 that detects a scene by detecting and collecting pairs of segments that have a mutual temporal distance within a predetermined time threshold and have dissimilarity smaller than or equal to predetermined dissimilarity.

CITATION LIST

Patent Literature

{PTL 1} JP-A-H10-234004
{PTL 2} JP-A-2000-285242

Non-Patent Literature

{NPL 1} Iwai, Yoshio, Osamu Yamaguchi, Takatsugu Hirayama, et al. "Face detection and face recognition by image processing," Information Processing Society of Japan SIG. notes (CVIM-149), 2005, pp. 343-368
{NPL 2} Akamatsu Shigeru, "Computer recognition of human face—A survey—," The Institute of Electronics, Information, and Communication Engineers Transactions Vol. J80-A, No. 8, pp. 1215-1230, 1997.8

SUMMARY OF INVENTION

Technical Problem

A first problem of the conventional techniques is that an identity determination on objects cannot be performed with high accuracy. The reason is that the identity of objects is determined based only on the similarity between the objects, which can make the identity determination inaccurate when the extraction of the features of the objects or the calculation of the similarity fails or when the objects are shot under different illumination conditions or in different directions.

A second problem of the conventional techniques is that it is impossible to determine identity on a pair of segments that have an interframe distance greater than or equal to a predetermined time threshold therebetween. For example, in a drama, a pair of segments that are temporally apart from each other and include the same person cannot be determined to be identical. The reason is that the conventional techniques are predicated on that a pair of identical segments are in positions temporally close to each other, and a pair of segments lying temporally apart from each other will not be determined to be identical even if their extracted features are similar to each other.

It is an object of the present invention is to determine whether or not objects appearing in various temporal positions in a video are identical to each other.

Solution to Problem

According to the present invention, there is provided an identity determination apparatus that is characterized by determining identity between a plurality of objects detected from an input video by using an object identity probability determined based on an interframe distance, the interframe distance being a distance between frames from which the respective objects are detected.

According to the present invention, there is also provided an identity determination method that is characterized by determining identity between a plurality of objects detected from an input video by using an object identity probability determined based on an interframe distance, the interframe distance being a distance between frames from which the respective objects are detected.

According to the present invention, there is also provided an identity determining program for making a computer function as an identity determination apparatus that is characterized by determining identity between a plurality of objects detected from an input video by using an object identity probability determined based on an interframe distance, the interframe distance being a distance between frames from which the respective objects are detected.

Advantageous Effects of Invention

A first effect is that an identity determination on objects can be performed with high accuracy. The reason is that the object identity probability can be calculated or selected by using the probabilities of appearance of an identical object with respect to interframe distances, so that an identity determination is performed according to a scenario of the input video. Another reason is that object identity probabilities calculated or selected based on interframe distances can be used aside from the similarity of features between the objects to suppress a drop in the accuracy of identity determination when the extraction of features from moving bodies or the calculation of similarity fails.

A second effect is that identity can be determined on a pair of segments that have an interframe distance greater than or equal to a predetermined time threshold therebetween. For example, in a drama, a pair of segments that are temporally apart from each other and include the same person can be determined to be identical. The reason is that even if a pair of segments are temporally apart from each other, they can be determined to be identical according to the identity probability between the pair of video segments which is calculated or selected based on the interframe distance between the pair of segments.

BRIEF DESCRIPTION OF DRAWINGS

{FIG. 26} A table showing an example of the output of a determination result outputting unit according to the first best mode for carrying out the present invention.

{FIG. 27} A table showing an example of a correspondence table of interframe distances and object identity probabilities to be stored in an object identity probability storing section according to the second best mode for carrying out the present invention.

{FIG. 28} A table showing an example of the output of the determination result outputting unit according to the third best mode for carrying out the present invention.

Figure 1:
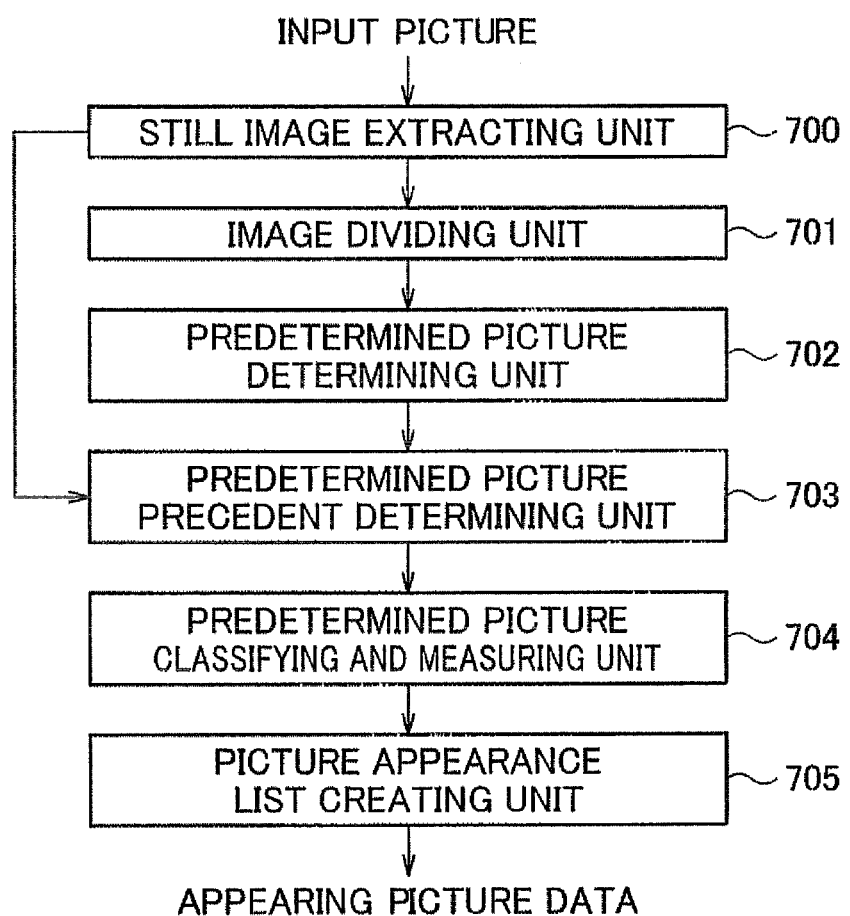
{FIG. 1} A block diagram of Patent Literature 1 which is an example of a conventional video generation system.
Figure 2:
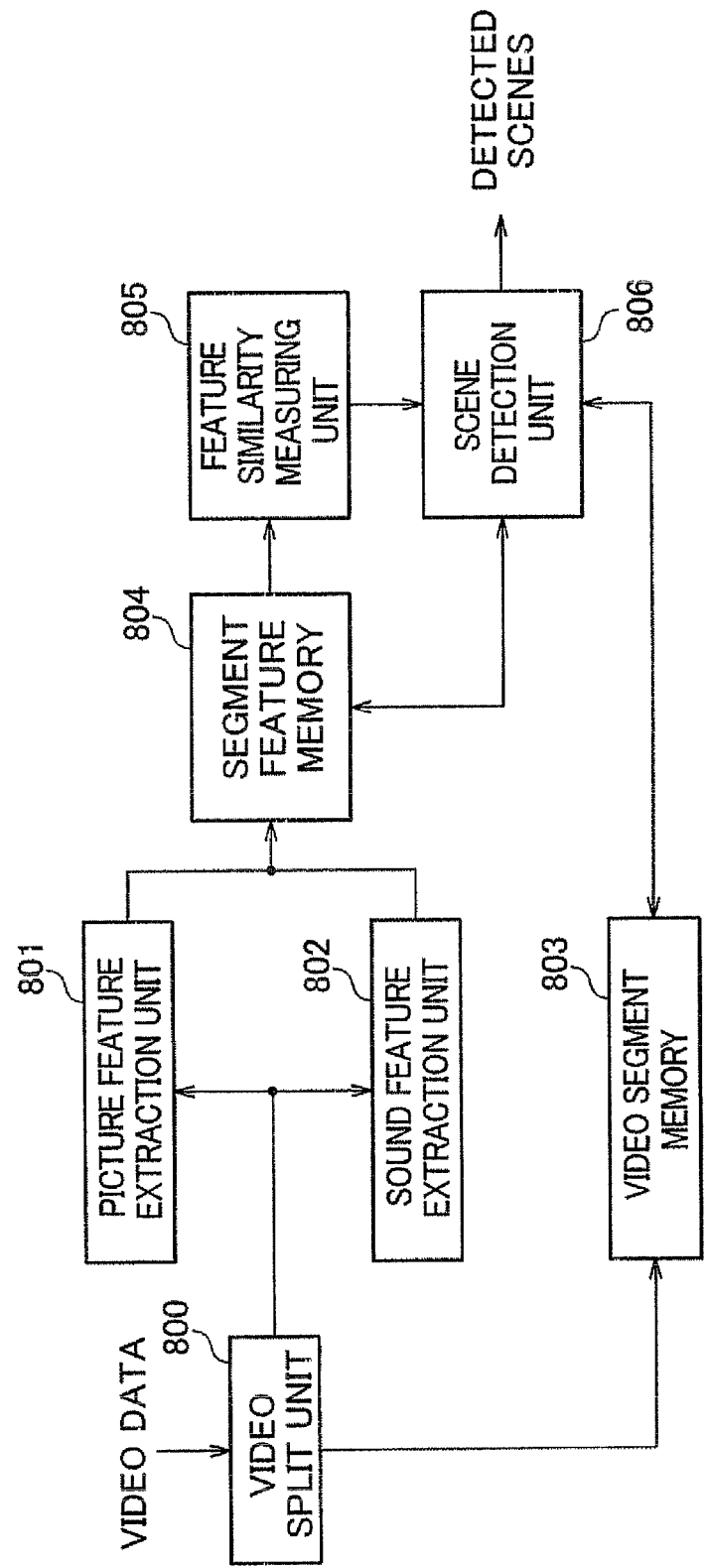
{FIG. 2} A block diagram of Patent Literature 2 which is an example of a conventional video generation system.

REFERENCE SIGNS LIST 100, 200, 300, 400, 500, 600, 900 Data processing apparatus
101, 201, 301, 901 Object detecting unit
102, 202, 303, 902 Interframe distance calculating unit
905 Inter-coordinate distance calculating unit
302 Feature extracting unit
103, 305 Object identity probability calculating unit
203, 903 Object identity probability selecting unit
104, 204, 306, 904 Identity determining unit
304 Similarity calculating unit
110, 210, 310, 410, 510, 610, 910 Video inputting unit
120, 220, 420, 520, 920 Storage apparatus
320, 620 Image storage apparatus
121, 921 Identity probability calculating function storing section
130, 230, 320, 430, 530, 630, 930 Determination result outputting unit
440, 540, 640 Identity determining program 221 Object identity probability storing section
331 Image storing section
240, 550 Command input apparatus
700 Still image extracting unit
701 Image dividing unit
702 Predetermined video determining unit
703 Predetermined video precedent determining unit
704 Predetermined video classifying and measuring unit
705 Video appearance list creating unit
800 Video split unit
801 Video feature extraction unit
802 Sound feature extraction unit
803 Video segment memory
804 Segment feature memory
805 Feature similarity measuring unit
806 Scene detection unit

DESCRIPTION OF EMBODIMENTS

Hereinafter, best modes for carrying out the present invention will be described in detail with reference to the drawings.
(Best Mode 1)
A first best mode for carrying out the present invention will now be described in detail with reference to the drawings.

Figure 3:
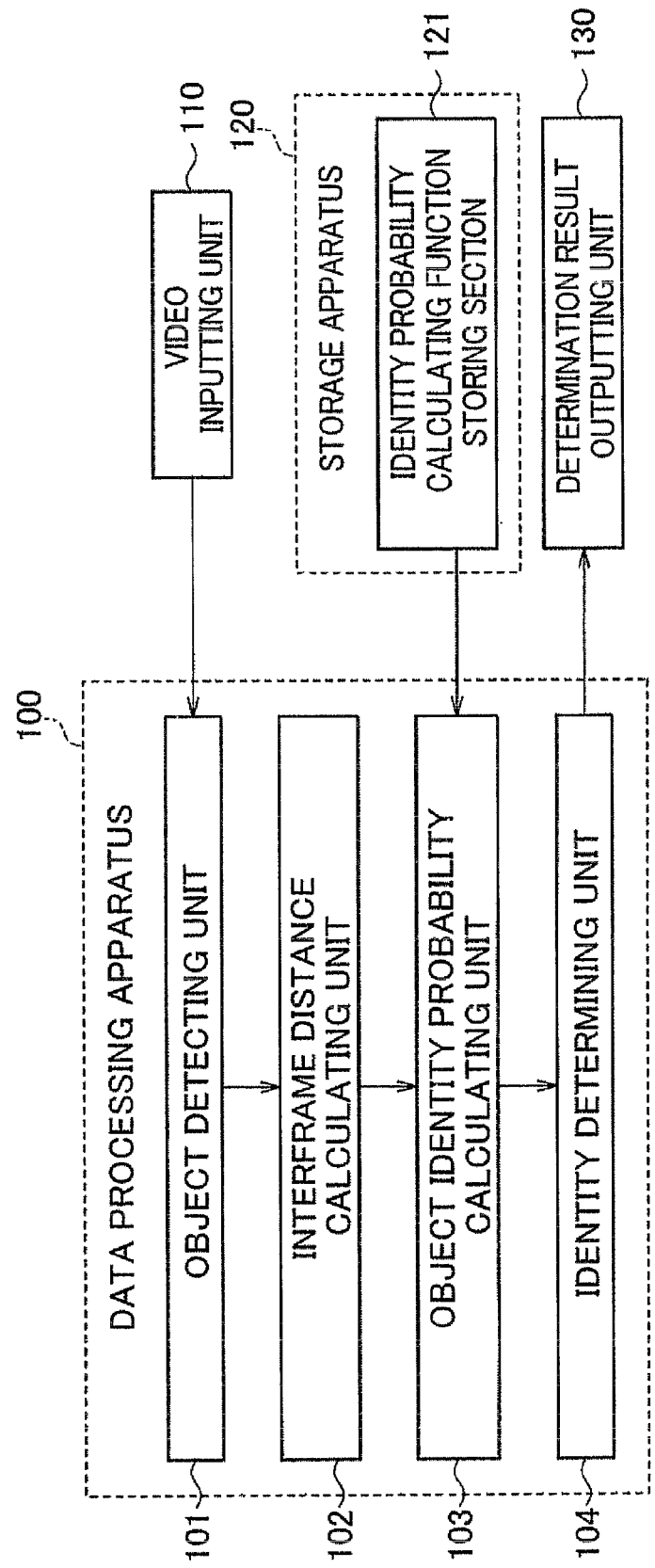
{FIG. 3} A block diagram showing the configuration of a first best mode for carrying out the present invention.

Referring to FIG. 3, the first best mode for carrying out the present invention includes: a data processing apparatus 100 which operates under a program control; a video inputting unit 110 for inputting a video; a storage apparatus 120 which contains object identity probability calculating functions; and a determination result outputting unit 130 for outputting the result of identity determination on objects.

The data processing apparatus 100 includes an object detecting unit 101, an interframe distance calculating unit 102, an object identity probability calculating unit 103, and an identity determining unit 104.

The object detecting unit 101 detects objects from each frame that constitutes a video received from the video inputting unit, and extracts frame numbers at which the objects are detected. The object detecting unit 101 also assigns unique object IDs to the respective objects detected. The object detecting unit 101 outputs the frame numbers and the object IDs to the interframe distance calculating unit 102.

The objects may be a whole of a frame or a part of a frame such as a moving area having an identical motion component like a vehicle and a ball, a still area having an identical color component like the sky and the ground, and an image area having a certain pattern like a person and an animal.

The object IDs may be numbers, alphabets, or other letters or symbols that are assigned in the order of detection by the object detecting unit 101.

The interframe distance calculating unit 102 receives the frame numbers and the object IDs from the object detecting unit 101, and calculates interframe distances, or the distances between the frames at which the objects are detected, based on the frame numbers received. The interframe distance calculating unit 102 outputs the interframe distances, the pairs of frames between which the interframe distances are calculated, and the object IDs of the objects detected from the pairs of frames to the object identity probability calculating unit 103.

The interframe distances may be a medium time that is calculated from a difference between the frame numbers, a scenario time that is calculated from a difference between times on a script to which the frames correspond, or a medium time or a scenario time that is weighted based on any one or a combination of a shot change, a camerawork change, a scene change, a BGM change, and a change in an image feature of a background.

Using an object identity probability calculating function selected from an identity probability calculating function storing section 121, the object identity probability calculating unit 103 calculates object identity probabilities between objects that are included in the respective frames in the pairs of frames between which the interframe distances received from the interframe distance calculating unit 102 are calculated. The object identity probability calculating unit 103 outputs the object identity probabilities, the object IDs of the objects of which the object identity probabilities are calculated, and the frame numbers at which the objects are detected to the identity determining unit 104.

The identity determining unit 104 determines the identity of a group of objects detected from the input video, based on the object identity probabilities between the objects received from the object identity probability calculating unit 103, and gives an identical group ID to objects that are determined to be identical. The identity determining unit 104 outputs group IDs, the object IDs belonging to the groups, and the frame numbers at which the objects are detected to the determination result outputting unit 130 as the result of identity determination.

The group IDs may be numbers or alphabets that are determined by rank based on the number of objects belonging to a group, the sizes of the objects occupying an image, the number of objects detected at a point where BGM becomes exciting, etc.

The storage apparatus 120 includes the identity probability calculating function storing section 121.

The identity probability calculating function storing section 121 contains object identity probability functions for calculating the identity of objects included in a pair of frames based on the distance between the frames, and outputs an object identity probability function selected by the object identity probability calculating unit 103 to the object identity probability calculating unit 103.

The determination result outputting unit 130 outputs the result of identity determination on the objects received from the identity determining unit 104. The output may be presented on-screen in the form of a table that includes the group IDs, frame numbers, and the object IDs of the respective objects detected. The output may be in other forms.

(Operation 1 of Best Mode)
Next, the overall operation of the best mode will be described in detail with reference to FIG. 3 and the flowchart of FIG. 4.

Figure 4:
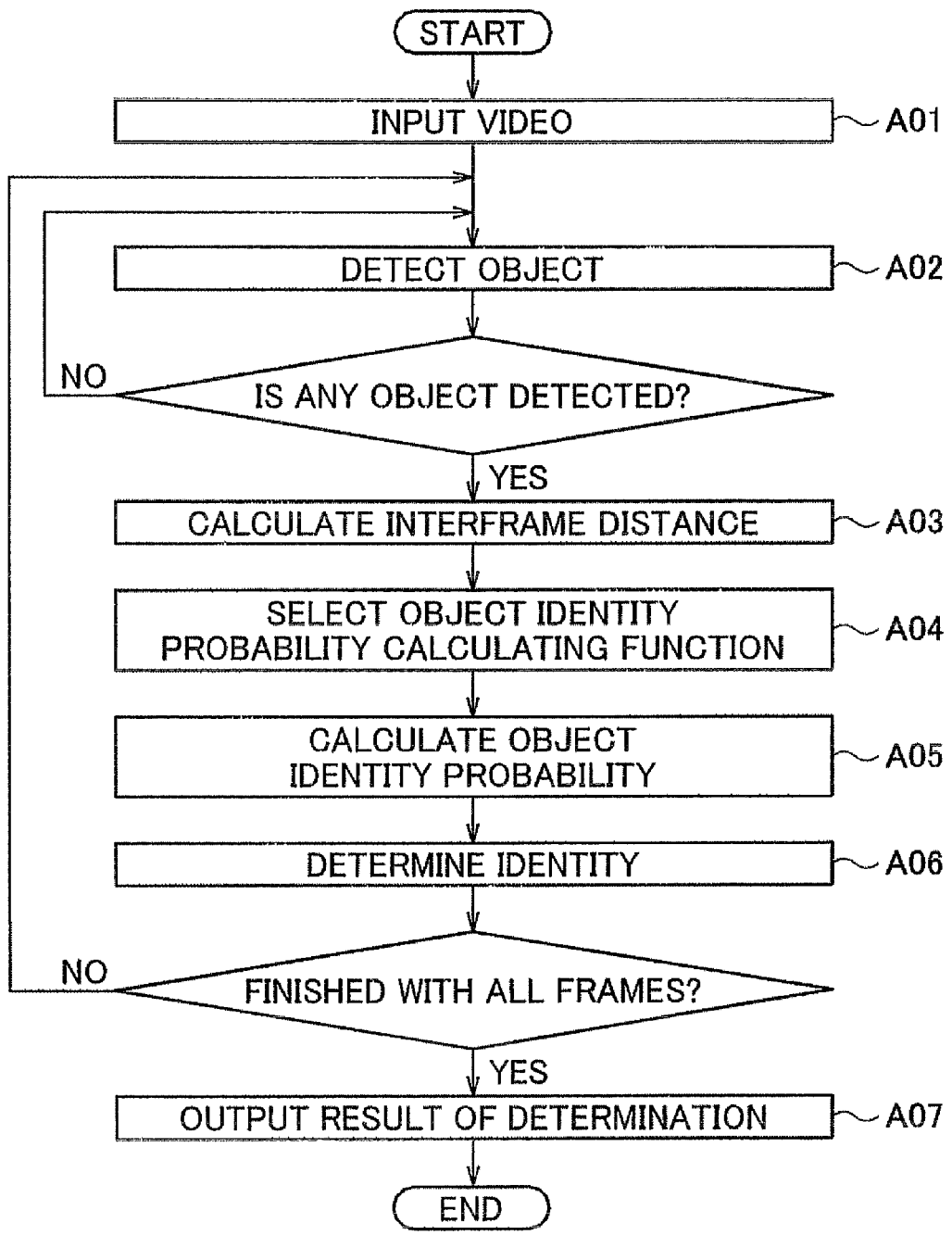
{FIG. 4} A flowchart showing the operation of the first best mode for carrying out the present invention.

Initially, the video inputting unit 110 inputs each frame that constitutes an input video to the object detecting unit 101 (step A01 in FIG. 4).

The object detecting unit 101 detects an object from the input frame (step 502).

For the sake of detecting an object, pattern recognition techniques are used. In an example of the techniques, the object detecting unit 101 calculates differences in pixel value between an object image that is stored as a template in advance and an input frame, and determines the presence of an object in the input image if the differences fall to or below a threshold. The object image to be stored as a template may be an image that is input by a user through the video inputting unit or an image that is selected by the object detecting unit based on user-specified features of an object. Objects may be detected by using the template-based technique illustrated, or by applying other methods.

If an object is detected, the object detecting unit 101 outputs the frame number at which the object is detected and the object ID to the interframe distance calculating unit 102.

When an object is detected by the object detecting unit 101 from the input frame, the interframe distance calculating unit 102 calculates interframe distances to previous frames from which objects are detected (step A03).

Figure 5:
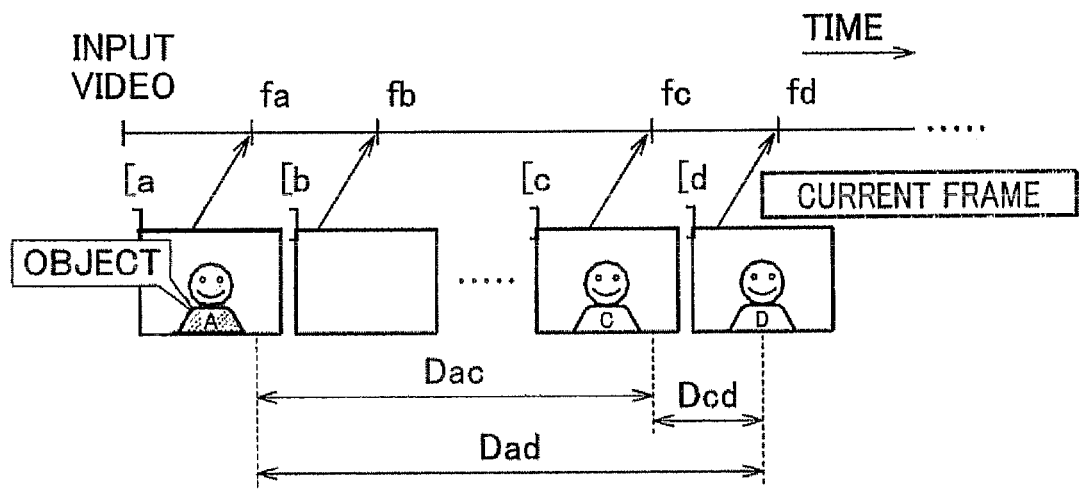
{FIG. 5} A diagram for explaining the operation of an interframe distance calculating unit according to the first best mode for carrying out the {present invention.

The processing of the interframe distance calculating unit 102 will be described with reference to FIG. 5. Suppose now that the object detecting unit 101 detects an object from a frame (d) input from the video inputting unit 110, and assigns an object ID "D" thereto. Suppose also that the object detecting unit 101 has detected objects from previous frames (a) and (c), and assigned object IDs "A" and "C" thereto, respectively. No object has been detected from a previous frame (b). Here, the interframe distance calculating unit 102 calculates interframe distances Dad and Dcd between the input frame (d) and the object-detected previous frames (a) and (c), respectively. The interframe distance calculating unit 102 does not calculate an interframe distance to the frame (b) from which no object has been detected. The interframe distance Dad is calculated based on the frame numbers fa and fd of the frames (a) and (d). The interframe distance Dad may be a difference between the frame numbers fa and fd, a difference between script times to which fa and fd correspond, respectively, or any other distances.

The object identity probability calculating unit 103 selects an object identity probability calculating function from the identity probability calculating function storing section 121 (step A04), Using the object identity probability calculating function selected, the object identity probability calculating unit 103 calculates object identity probabilities, which indicate the identity between the respective objects detected from the input frame and the previous frames, based on the interframe distances calculated between the input frame and the previous frames (step A05).

For the object identity probability calculating function, functions that are based on prior knowledge on the tendency of appearance of objects in an input video as described below may be used.

Figure 6:
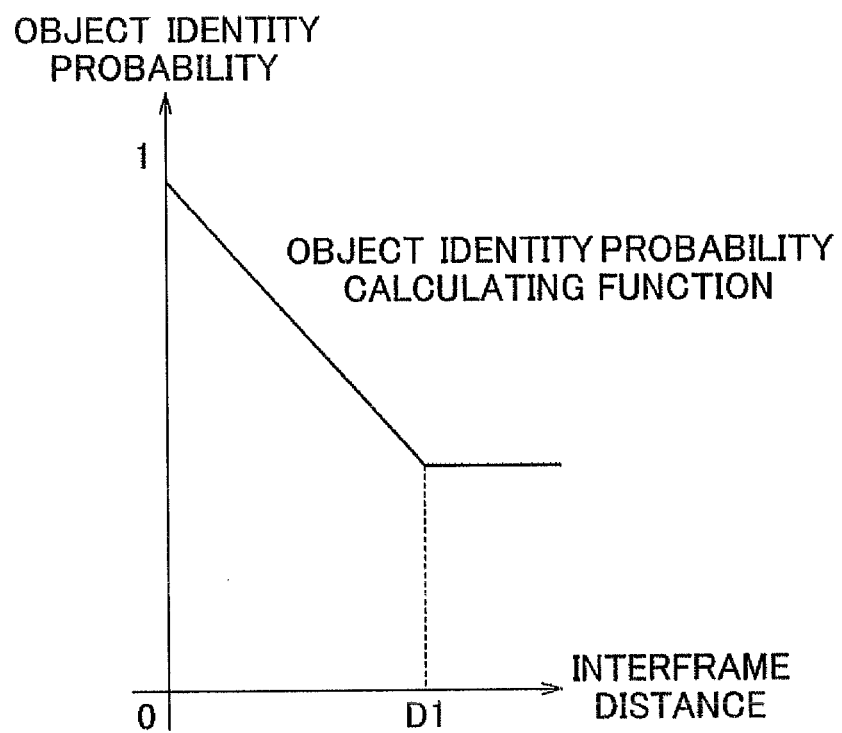
{FIG. 6} A chart showing an example of an identity probability calculating function that is based on prior knowledge that an identical object tends to appear again within a predetermined time.

(1) A function based on prior knowledge that "an identical object tends to appear again within a predetermined time" (FIG. 6)

A function that produces a linearly-increasing object identity probability with a decreasing interframe distance for objects that are included in a pair of frames with an interframe distance shorter than D1, and produces a constant object identity probability for objects that are included in a pair of frames with an interframe distance longer than D1, is effective in determining identity between objects that are detected from a video in which the probability of an identical object appearing again within an interframe distance of D1 is high.

As an example, description will be given of identity determination on performers in a drama. In dramas, performers repeat appearing within a video segment D1 that shows an identical scene of the story. The probability of identical performers appearing again within an interframe distance D1 is thus high. In such cases, this function can be effectively used to determine the identity of performers satisfactorily.

Figure 7:
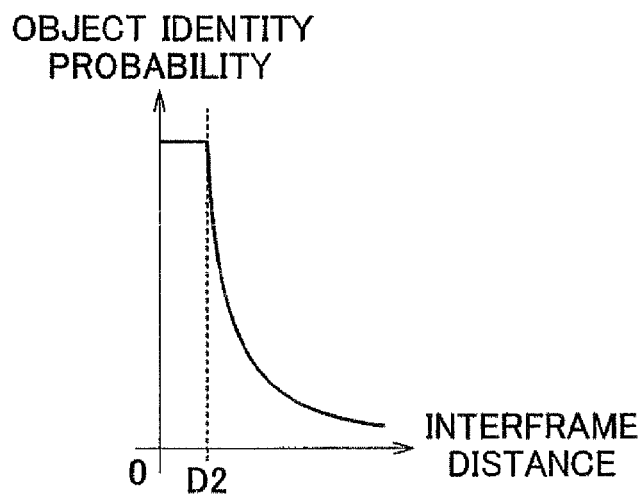
{FIG. 7} A chart showing an example of an identity probability calculating function that is based on prior knowledge that an identical object tends to appear continuously for a certain time.

(2) A function based on prior knowledge that "an identical object tends to appear continuously for a certain time" (FIG. 7)

A function that produces an object identity probability of constant high value for objects that are included in a pair of frames with an interframe distance shorter than D2, and produces a decreasing object identity probability with an increasing interframe distance for objects that are included in a pair of frames with an interframe distance longer than D2, is effective in determining identity between objects that are detected from a video in which the probability of an identical object appearing again within an interframe distance of D2 is high.

As an example, description will be given of identity determination on vehicle bodies in a road surveillance video where a single lane is shot by a fixed camera. In the video, an identical vehicle appears continuously for a continuous video segment D2 from when the vehicle appears until it drives off. The probability of an identical vehicle appearing in an interframe distance D2 is thus high. In such cases, this function can be effectively used to determine the identity of vehicle bodies satisfactorily.

Figure 8:
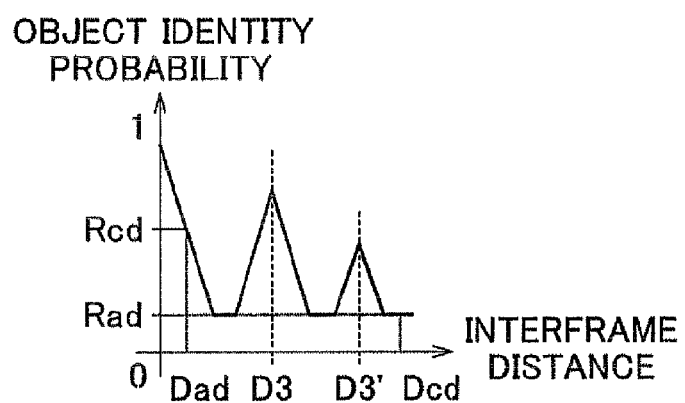
{FIG. 8} A chart showing an example of an identity probability calculating function that is based on prior knowledge that an identical object tends to appear again after a certain time.

(3) A function based on prior knowledge that "an identical object tends to appear again after a certain time" (FIG. 8)

A function that produces an object identity probability of high value for objects that are included in a pair of frames with an interframe distance of D3 or D3', and produces a decreasing identity probability with an increasing distance from the interframe distance D3 or D3', is effective in determining identity between objects that are detected from a video in which the probability of an identical object appearing again after certain times of D3 and D3' is high.

As an example, description will be given of identity determination on vehicle bodies in an auto racing video. In auto races where vehicle bodies go around a course, a camera installed in a position shoots vehicle bodies each time the vehicle bodies pass the installed position of the camera. The probability is thus high that identical vehicle bodies appear again certain times D3 and D3' after the appearance of the vehicle bodies in the video. In such cases, this function can be effectively used to determine the identity of the vehicle bodies satisfactorily.

Figure 9:
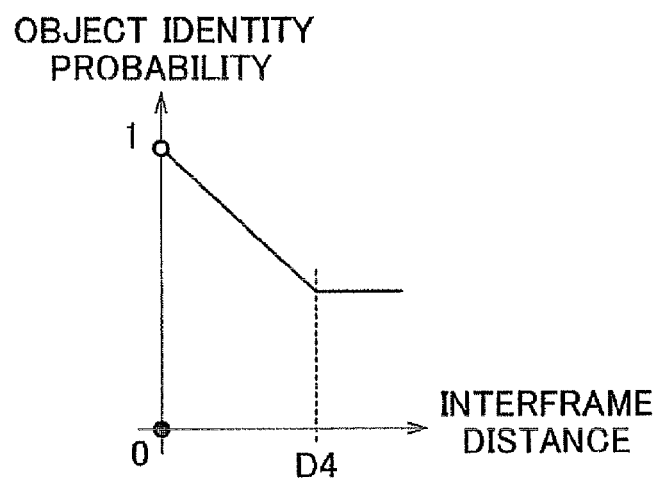
{FIG. 9} A chart showing an example of an identity probability calculating function that is based on prior knowledge that identical objects will not appear in the same frame.

(4) A function based on prior knowledge that "identical objects will not appear in the same frame" (FIG. 9)

A function that produces an object identity probability of 0 for objects that are included in a pair of frames with an interframe distance of 0 is effective in determining identity between objects that are detected from a video in which a plurality of objects detected from the same frame are different from each other.

As an example, description will be given of identity determination on performers in a drama. In dramas, the probability of identical persons appearing in the same frame is zero. In such cases, this function can be effectively used to avoid an erroneous determination that different objects are identical.

Any one or a combination of the foregoing functions may be used for the object identity probability calculating functions. Other functions may also be used.

The operation of the object identity probability calculating unit 103 will be described with the object identity probability calculating function of FIG. 8. Suppose now that interframe distances Dad and Dcd, calculated between the input frame (d) and the previous frames (a) and (c), are input from the interframe distance calculating unit 102. Here, using the interframe distances Dad and Dcd and the object identity probability calculating function shown in FIG. 8, the object identity probability calculating unit 103 can calculate the identity probabilities Rad and Rcd between the objects detected from the input frame (d) and the frames (a) and (c).

The identity determining unit 104 determines the identity between the objects detected from the input frame and the respective previous frames based on the object identity probabilities, and assigns an identical group ID to objects that are determined to be identical (step A06). The processing of the identity determining unit 104 will be described with reference to FIGS. 5 and 8. Suppose now that the identity probabilities Rad and Rcd between the objects detected from the input frame (d) and the frames (a) and (c), respectively, are input from the object identity probability calculating unit 103. Assuming that the identity determining unit has a threshold TH, the objects having the object ID "D" and the object ID "A" included in the input frame (d) and the previous frame (a), respectively, are determined to be different from each other if TH and Rad satisfy Rad<TH. If TH and Rcd satisfy Rcd>TH, the objects having the object ID "D" and the object ID "C" included in the input frame (d) and the previous frame (c), respectively, are determined to be identical.

Suppose that the objects having the object ID "A" and the object ID "C" are determined to be identical at the time of input of the previous frame (c) because the identity probability Rac between the objects detected from the frames (a) and (c) and the threshold TH satisfy Rac>TH. When the new frame (d) is input as described above, and the objects having the object ID "D" and the object ID "A" are determined to be different and those having the object ID "D" and object ID "C" identical, the result of identity determination may be updated so that the objects having the object ID "A" and the object ID "C" are different from each other. The result of identity determination from a group of previous frames may be unconditionally updated based on the result of determination from a new input frame, or may be updated on a majority-decision basis by the result of determination on a group of frames that includes the group of previous frames and the additional input frame. The result of identity determination may also be updated depending on the result of determination based on a maximum value or minimum value of the object identity probabilities calculated in a group of frames that includes the group of previous frames and the additional input frame.

As a result of the update, an identical group ID is assigned to objects that are determined to be identical.

The threshold TH can be changed depending on the input video so that an object determination optimum to the input video is performed. The number of objects in an identical group and the number of groups can also be controlled.

The processing of steps A02 to A06 is repeated for each frame that constitutes the input video.

The determination result outputting unit 120 outputs the result of determination on the identity between the objects received from the identity determining unit 104 (step A07).

For example, the determination result outputting unit 120 may output group IDs, frame numbers, and object IDs in a table form as shown in FIG. 26, or in other forms. All the frame numbers and object IDs may be output. Consecutive frame numbers belonging to the same group may be summarized to output the top frame number and the object ID of the object detected from the frame. A representative frame number may be selected and output from among the frame numbers belonging to the same group. Group IDs may be assigned in the descending order of the number of objects belonging to the groups, or in the ascending order of the frame numbers of the objects belonging to the groups. The output may be in the form shown in FIG. 26 or in other forms.

Next, the effects of the best mode will be described.

With the conventional techniques, the identity of objects has been determined based on the similarity of features extracted from the objects. In contrast, according to the best mode, the identity of a pair of objects is determined based on an object identity probability that is calculated in accordance with the interframe distance between the frames from which the respective objects are detected. Since the object identity probability can be calculated based on the probability of appearance as to how much interframe distance an identical object appears with in the input video, there is provided the effect that determination can be made according to the scenario of the input video.

The conventional techniques have been predicated on that identical objects are in positions temporally close to each other, and objects have not been determined to be identical if the interframe distance therebetween is farther than or equal to a predetermined threshold. In contrast, the best mode has the effect that even a pair of objects that are temporally apart from each other can be determined to be identical if the object identity probability that is calculated or selected based on the interframe distance between the pair of objects is high.

According to the best mode, it is possible to store object identity probability calculating functions in advance, and select an appropriate function from among the stored functions depending on the video. For example, when determining the identity of performers in the video of a single episode of a drama series, it is possible to select an appropriate function from among the functions stored in the object identity probability storing section or combine the stored functions to generate an optimum function based on the times necessary between when performers appear and when they appear again and the frequencies thereof, which are determined from the videos of previous episodes. The object identity probability calculating function selected or generated in this way can be used to calculate object identity probabilities, with the effect that the identity of performers can be determined with high accuracy.

(Best Mode 2)

Next, a second best mode for carrying out the present invention will be described in detail with reference to the drawings.

Figure 10:
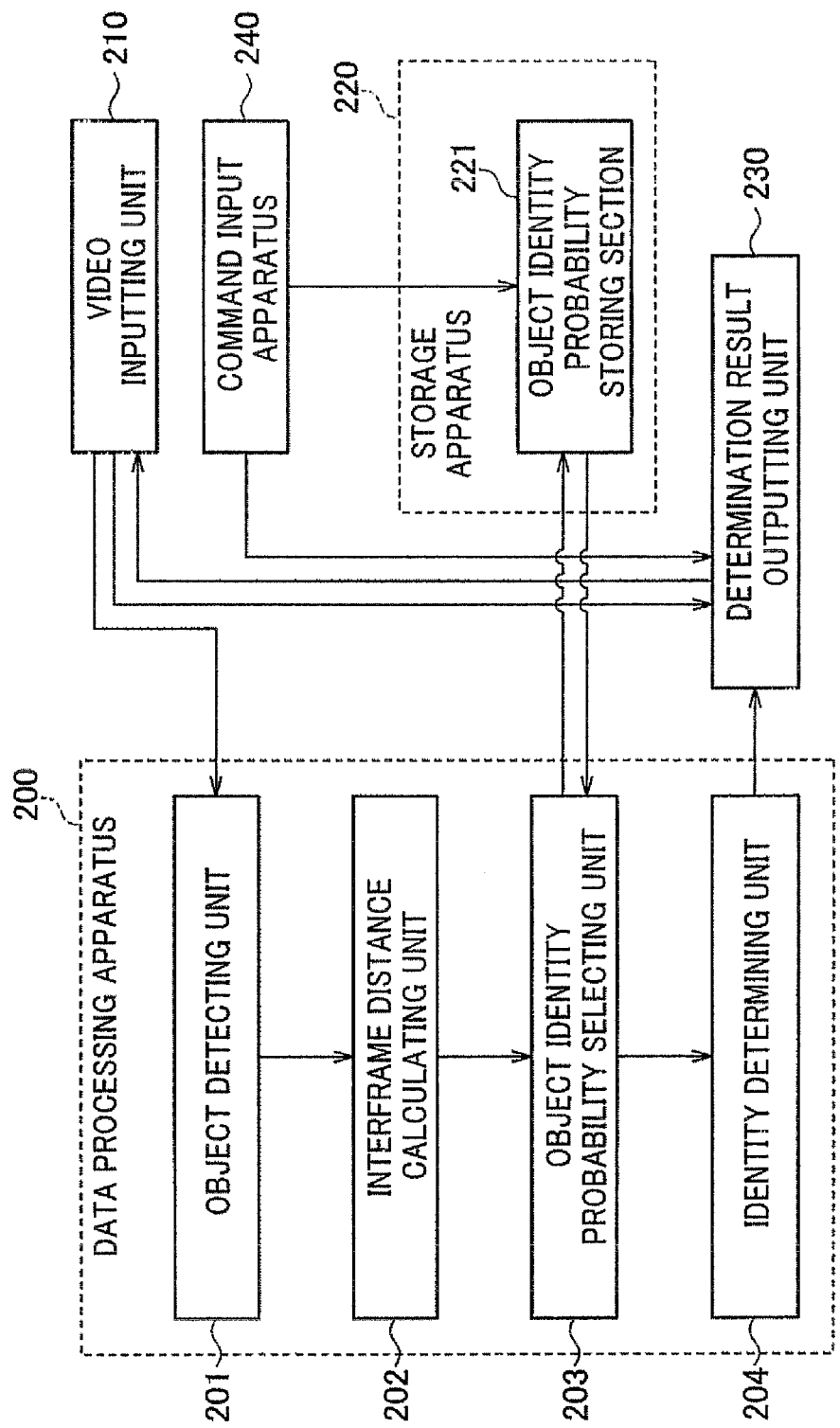
{FIG. 10} A block diagram showing the configuration of a second best mode for carrying out the present invention.

Referring to FIG. 10, the second best mode for carrying out the present invention is different from the first best mode in that it includes a command input apparatus 240, that a data processing apparatus 200 which operates under a program control includes an object identity probability selecting unit 203 instead of the object identity probability calculating unit 103, and that a storage apparatus 220 includes an object identity probability storing section 221.

A video inputting unit 210 inputs each frame that constitutes an input video to an object detecting unit 201. The video inputting unit 210 also outputs a video that starts from a frame having a frame number input from a determination result outputting unit 220 to the determination result outputting unit 220.

The storage apparatus 220 is composed of the object identity probability storing section 231.

The object identity probability storing section 221 contains a correspondence table of interframe distances and object identity probabilities. FIG. 27 shows an example of the correspondence table of interframe distances and object identity probabilities. The object identity probability storing section 221 outputs an object identity probability corresponding to the interframe distance input by the object identity probability selecting unit 203 to the object identity probability selecting unit 203.

The command input apparatus 240 accepts a command input made by a user, and inputs a correspondence table of interframe distances and object identity probabilities to the object identity probability storing section 221. The command input apparatus 240 also modifies the correspondence table of interframe distances and object identity probabilities that is stored in the object identity probability storing section 221 in advance. The command input apparatus 240 also inputs a command input made by the user as to the result of determination output from a determination result outputting unit 230 to the determination result outputting unit 230.

The object identity probability selecting unit 203 selects an object identity probability from the correspondence table of interframe distances and object identity probabilities stored in the object identity probability storing section 221, based on an interframe distance between an input frame and a previous frame which is calculated by an interframe distance calculating unit 202.

The determination result outputting unit 230 outputs the result of identity determination on objects received from an identity determining unit 204. The result of determination may be output in the form shown in FIG. 26. The determination result outputting unit 230 inputs a frame number input from the command inputting unit 240 by the user to the video inputting unit 210, and plays a video received from the video inputting unit 210.

(Operation of Best Mode 2)

Next, the overall operation of the best mode will be described in detail with reference to FIG. 10 and the flowchart of FIG. 11.

Figure 11:
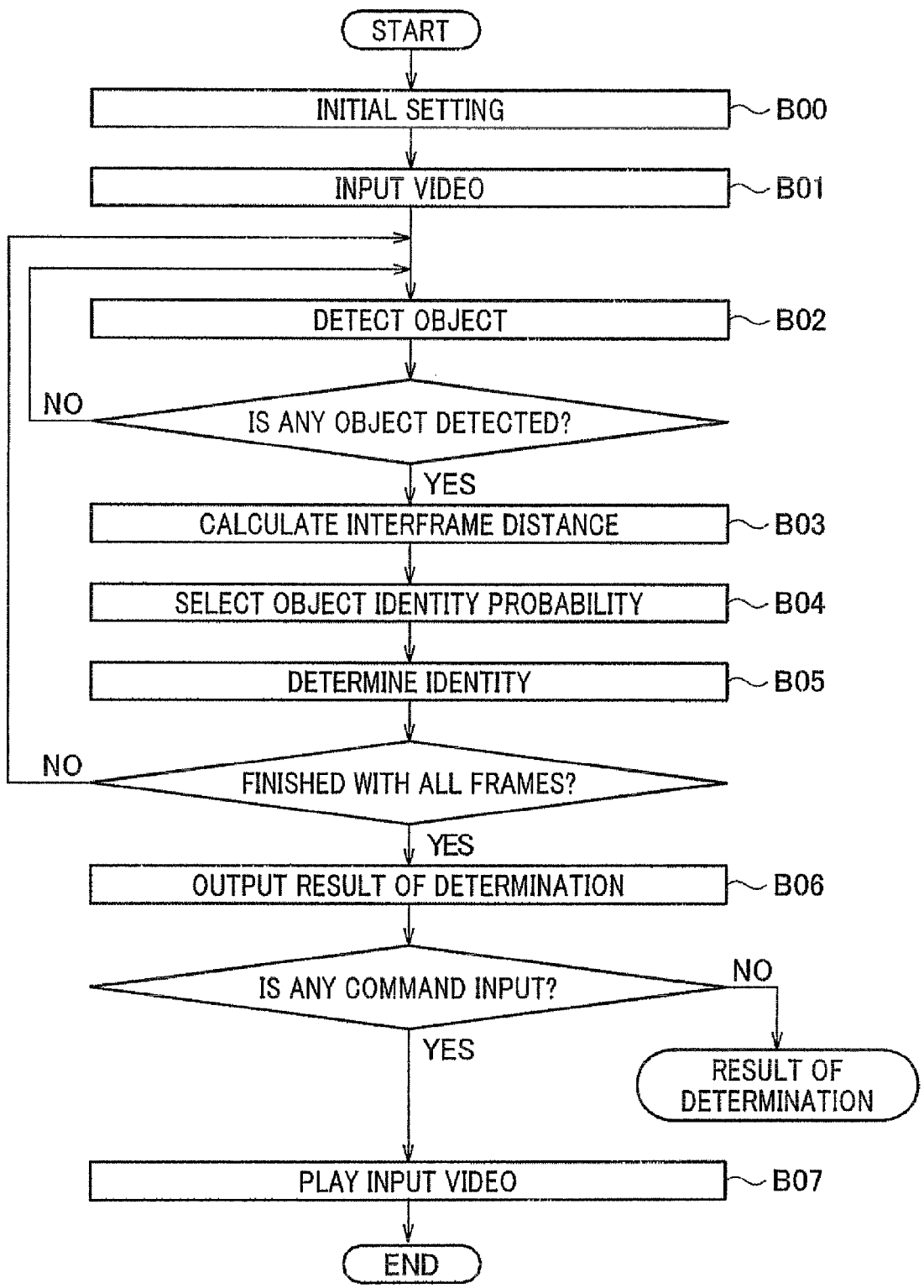
{FIG. 11} A flowchart showing the operation of the second best mode for carrying out the present invention.

The operation of the video inputting unit 210, the object detecting unit 201, the interframe distance calculating unit 202, and the identity determining unit 204 of the best mode shown at steps B01 to B03 and B05 of FIG. 11 is the same as that of the unit 110, 101, 102, 104, and 120 of the first best mode. Description thereof will thus be omitted.

Initially, the user inputs a correspondence table of interframe distances and object identity probabilities to the object identity probability storing section 221 through the command input apparatus 240. Alternatively, the user updates a correspondence table of interframe distances and object identity probabilities that is stored in the object identity probability storing section 221 in advance (step B00).

The object identity probability selecting unit 203 selects an object identity probability from the correspondence table of interframe distances and object identity probabilities stored in the object identity probability storing section 221, based on the interframe distance calculated between the input frame and a previous frame (step B04).

The operation of the object identity probability selecting unit will be described with the correspondence table of interframe distances and object identity probabilities of FIG. 26. If the interframe distance calculated between the input frame and the previous frame is D0, the object identity probability selecting unit selects R0 from the correspondence table shown in FIG. 27 as the identity probability of the objects included in the input frame and the previous frame, respectively. If the interframe distance is in the range of D1 to D2, R1 is selected as the object identity probability.

The determination result outputting unit 230 outputs the result of identity determination between the objects received from the identity determining unit 204 (step B06).

When the determination result outputting unit 230 receives a user's command input as to the result of determination from the command input apparatus 240, the determination result outputting unit 230 inputs the frame number corresponding to the user input to the video inputting apparatus 210. The video inputting apparatus 210 inputs a video that starts from the frame having the frame number received from the determination result outputting unit to the determination result outputting unit 220. The determination result outputting unit 230 plays the received video and presents it to the user (step B07). An example of this operation of the determination result outputting unit 230 will be described with reference to FIG. 26. When a group 1 of FIG. 26 is selected by the user, the determination result outputting unit 230 inputs the frame numbers fc and fd at which the objects having the object IDs "C" and "D" belonging to the group 1 appear to the video inputting unit 210, and plays the videos output from the video inputting unit 210. When the object having the object ID "A" is selected by the user, the determination result outputting unit 230 inputs the frame number fa at which "A" appears to the video inputting unit 210, and plays the video output from the video inputting unit 210. As a result, when a group of consecutive frames belonging to the same group is specified by the user, the user can view only scenes in which the same object appears. When the user specifies a group of representative consecutive frames in each group, the user can view a representative scene of each object.

Next, the effects of the best mode will be described.

With the conventional techniques, the identity of objects has been determined based on the similarity of features extracted from the objects. In contrast, according to the best mode, the identity of a pair of objects is determined based on an object identity probability that is calculated based on the interframe distance between the frames from which the respective objects are detected. Since the object identity probability can be calculated based on the probability of appearance as to how long interframe distance an identical object appears within the input video, there is provided the effect that determination can be made according to the scenario of the input video.

The conventional techniques have been predicated on that identical objects are in positions temporally close to each other, and objects have not been determined to be identical if the interframe distance therebetween is farther than or equal to a predetermined threshold. In contract, the best mode has the effect that even a pair of objects that are temporally apart from each other can be determined to be identical if the object identity probability that is selected based the interframe distance between the pair of objects is high.

According to the best mode, the user can update the correspondence table of interframe distances and object identity probabilities arbitrarily, and can thus switch to an appropriate correspondence table depending on the input video. For example, if the input video is a video of a drama series, it is possible to create a correspondence table from the time necessary between when a performer appears and when the performer appears again and the frequency thereof, based on the videos of past episodes, and store the correspondence table into the object identity probability storing section. This provides the effect that the identity determination can be performed with high accuracy.

(Best Mode 3)

Next, a third best mode for carrying out the present invention will be described in detail with reference to the drawings.

Figure 12:
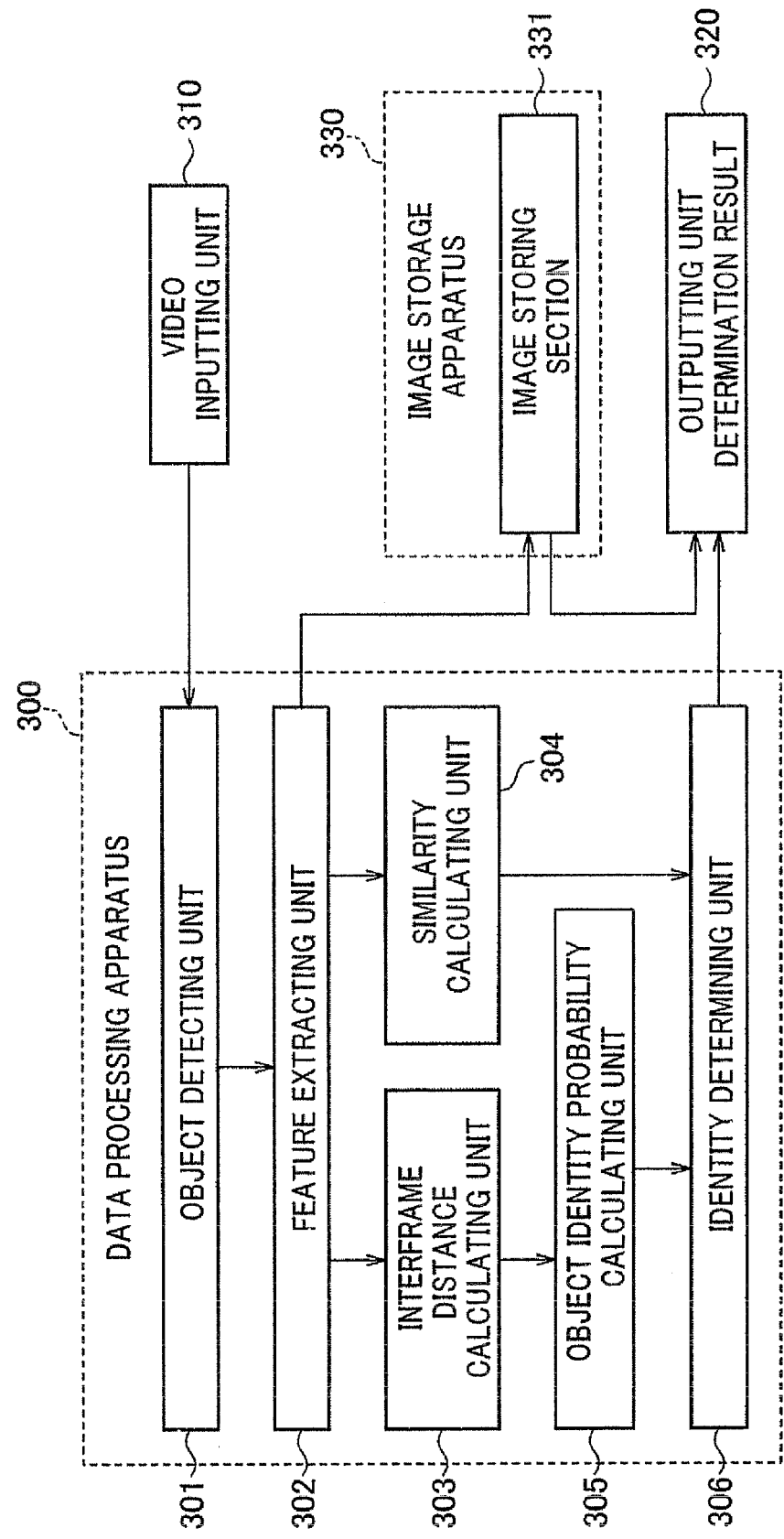
{FIG. 12} A block diagram showing the configuration of a third best mode for carrying out the present invention.

Referring to FIG. 12, the third best mode for carrying out the present invention is different from the first best mode in that a data processing apparatus 300 includes a feature extracting unit 302 and a similarity calculating unit 304 in addition to the configuration of the data processing apparatus 100 according to the first best mode shown in FIG. 3, and in including an image storage apparatus 330.

The feature extracting unit 302 extracts image data on an object that is detected from the input frame by an object detecting unit 301, a feature extracted from the image data, and the frame number. The feature extracting unit 302 stores the image data on the object into an image storing section 332, inputs the feature taken out of the image data to the similarity calculating unit 304, and inputs the frame number to an interframe distance calculating unit 303.

The similarity calculating unit 304 calculates similarity between objects based on the feature of the object in the input frame and the features of objects in previous frames, which are received from the feature extracting unit 302, and inputs the similarity to an identity determining unit 306. The similarity, for example, is determined by a difference between the feature of the object in the input frame and the feature of an object in a previous frame. The similarity may be calculated for all the combinations of the object in the input frame and a group of objects in the previous frames, or may be calculated for selected combinations.

The identity determining unit 306 determines the identity of the objects based on object identity probabilities calculated between the object in the input frame and the objects in the previous frames, received from an object identity probability calculating unit 305, and the similarity calculated between the object in the input frame and the objects in the previous frames, received from the similarity calculating unit 304. Based on the result of determination between the object detected from the input frame and the group of objects detected from the group of previous frames, the identity determining unit 306 also updates the result of identity determination that has been obtained from among the group of objects detected from the group of previous frames.

A determination result outputting unit 320 outputs the result of determination by using the result of determination received from the identity determining unit 306 and the image data on the objects stored in the image storing section.

(Operation of Best Mode 3)

Next, the overall operation of the best mode will be described in detail with reference to FIG. 12 and the flowchart of FIG. 13.

Figure 13:
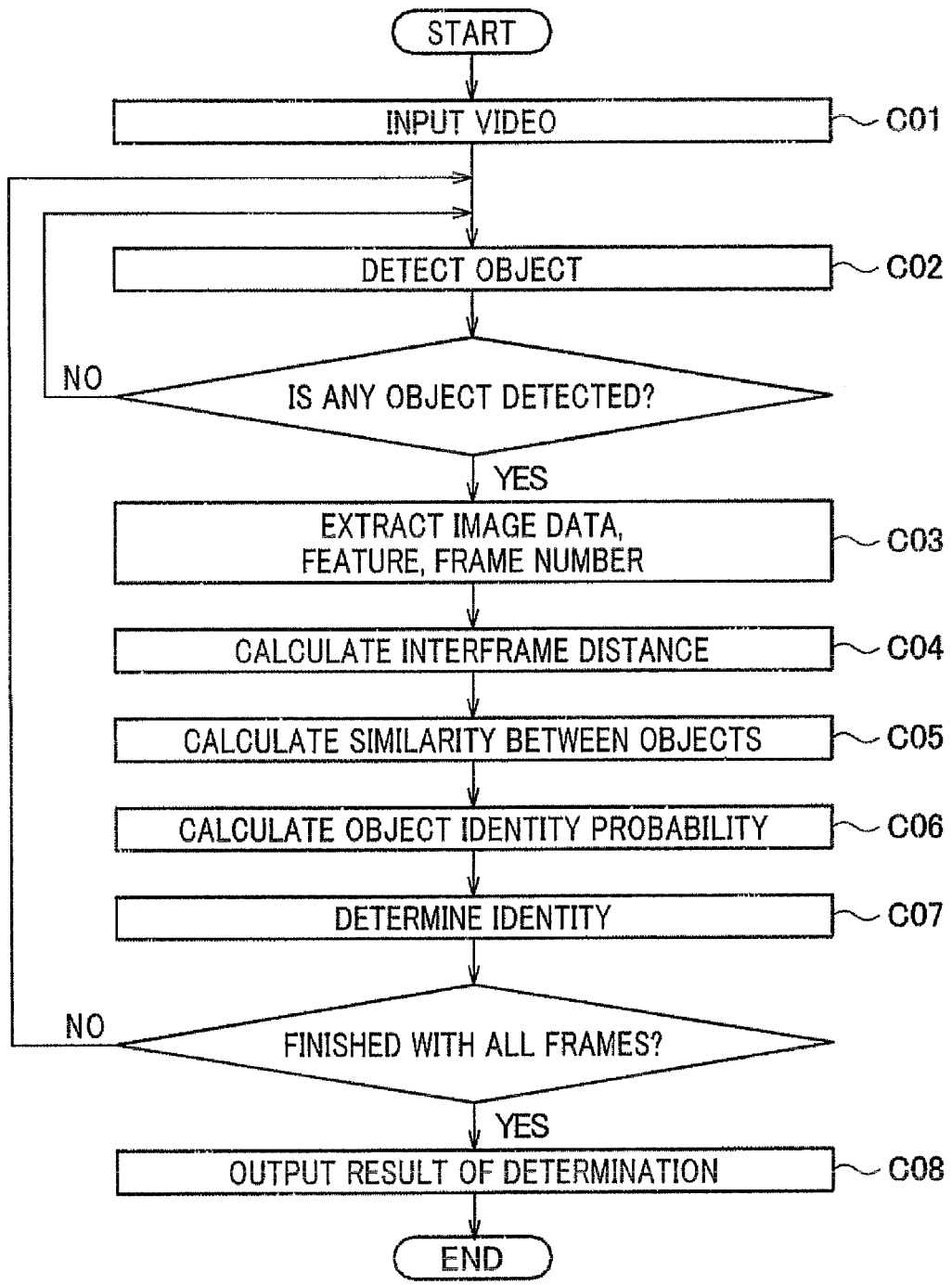
{FIG. 13} A flowchart showing the operation of the third best mode for carrying out the present invention.

The operation of the video inputting unit 310, the object detecting unit 301, and the interframe distance calculating unit 303 of the best mode shown at steps C01, C02, and C04 of FIG. 13 is the same as that of the unit 110, 101, 102, and 104 of the first best mode. Description thereof will thus be omitted.

When an object is detected from the input frame by the object detecting unit 301, the feature extracting unit 302 extracts the image data on the object, a feature extracted from the image data, and the frame number (step C03).

Based on the feature of the object extracted by the feature extracting unit 302, the similarity calculating unit 304 calculates the similarity between the object detected from the input frame and objects detected from previous frames (step C05).

The object identity probability calculating unit 305 calculates object identity probabilities between the objects detected from the input frame and the previous frames, based on the similarity calculated by the similarity calculating unit 304 and the interframe distances calculated by the interframe distance calculating unit 303 (step C06).

The identity determining unit 306 determines the identity of the objects based on the object identity probabilities and the similarity. For example, the object in the input frame and an object in a previous frame may be determined to be identical when the product of the object identity probability and the similarity is greater than or equal to a threshold. The objects may be determined to be identical when both the object identity probability and the similarity are higher than or equal to thresholds. Other determination methods used. Based on the result of determination between the object detected from the input frame and the group of objects detected from the group of previous frames, the identity determining unit 306 updates the result of identity determination that has been obtained from among the group of objects detected from the group of previous frames (step C07).

The steps C01 to C07 are performed on all the frames that constitute the input video.

The determination result outputting unit 320 outputs the result of determination outside based on the result of identity determination between the objects and the image data on the objects stored in the image storing section (step C08).

FIG. 28 shows an example of the output of the result of determination. Objects that are determined to be identical are grouped into an identical group. Groups ID, frame numbers, object IDs, and image data are output in a table form group by group. The group IDs may be assigned in the descending order of the area size of the image data on the object, or may be assigned in the order of closeness of the position where the image data on the object appears to the center. Representative image data in each group may be output alone. This allows the user to recognize at a glance what each object actually looks like in the video. The output may be in the form shown in FIG. 28 or in other forms.

Next the effect of the best mode will be described.

With the conventional techniques, the identity of objects has been determined based only on the similarity of features extracted from the respective objects. In contrast, the best mode uses not only the similarity of the features extracted from the respective objects but the interframe distances calculated from pairs of objects in combination. This provides the effect of suppressing a drop in the accuracy of the identity determination when the extraction of features of objects or the calculation of similarity fails.

(Best Mode 4)

Next, a fourth best mode for carrying out the present invention will be described in detail with reference to the drawings.

Figure 14:
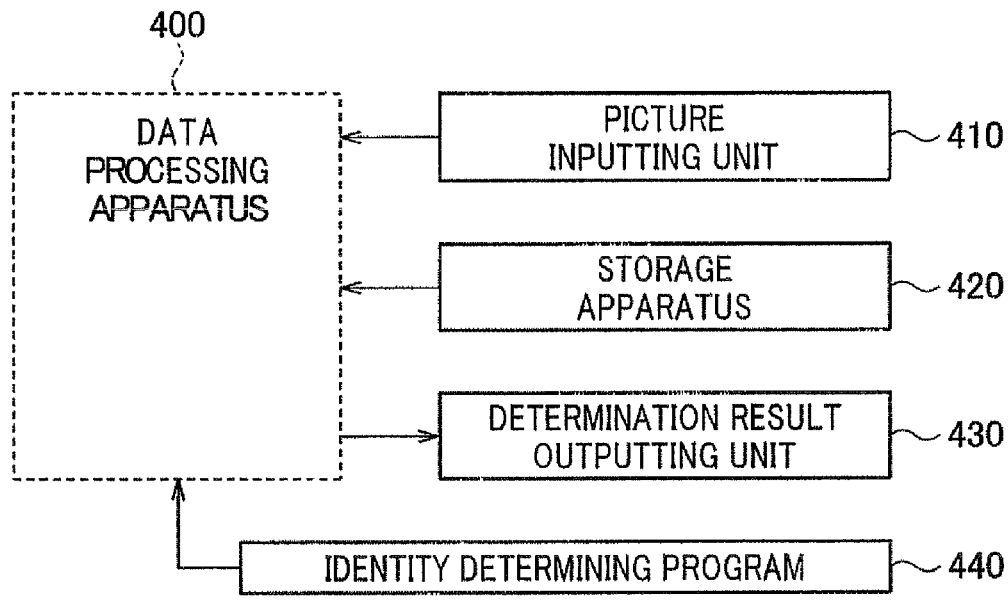
{FIG. 14} A block diagram showing the configuration of a fourth best mode for carrying out the present invention.

Referring to FIG. 14, the fourth best mode for carrying out the present invention includes a video inputting unit, a data processing apparatus, a storage apparatus, and a determination result outputting unit as with the first best mode for carrying out the present invention.

An identity determining program 440 is read into a data processing apparatus 400 and controls the operation of the data processing apparatus 400, whereby the result of determination that is obtained by unit of the data processing apparatus 400 based on a video input from a video inputting unit 410 and object identity probability calculating functions input from a storage apparatus 420 is output to a determination result outputting unit 430. Under the control of the identity determining program 440, the data processing apparatus 400 performs the same processing as that of the data processing apparatus 100 according to the first best mode.

(Best Mode 5)

Next, a fifth best mode for carrying out the present invention will be described in detail with reference to the drawings.

Figure 15:
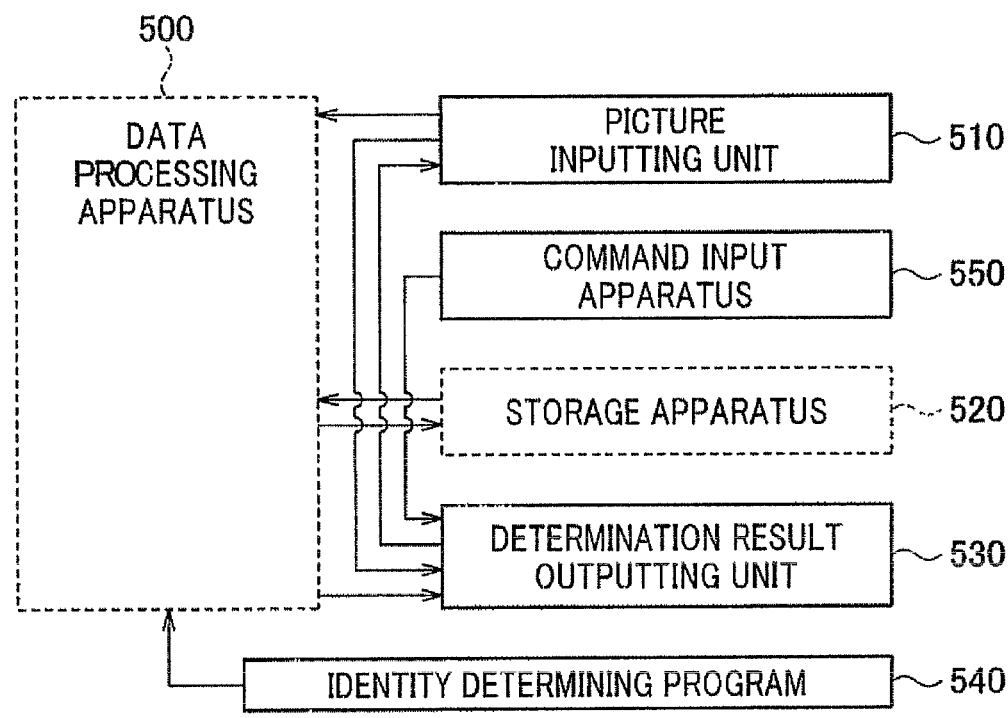
{FIG. 15} A block diagram showing the configuration of a fifth best mode for carrying out the present invention.

Referring to FIG. 15, the fifth best mode for carrying out the present invention includes a video inputting unit, a data processing apparatus, a storage apparatus, a command input apparatus, and a determination result outputting unit as with the second best mode for carrying out the present invention.

An identity determining program 540 is read into a data processing apparatus 500 and controls the operation of the data processing apparatus 500, whereby the result of determination that is obtained by unit in the data processing apparatus 500 based on data in a storage apparatus 520 is output to a determination result outputting unit 530. Under the control of the identity determining program 540, the data processing apparatus 500 performs the same processing as that of the data processing apparatus 200 according to the second best mode.

(Best Mode 6)

Next, a sixth best mode for carrying out the present invention will be described in detail with reference to the drawings.

Figure 16:
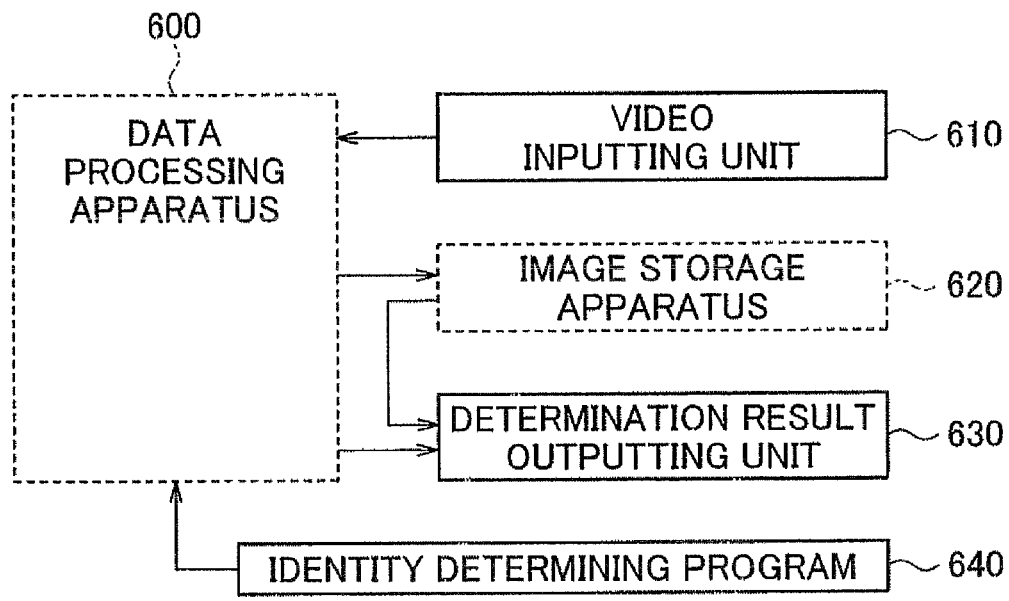
{FIG. 16} A block diagram showing the configuration of a sixth best mode for carrying out the present invention.

Referring to FIG. 16, the sixth best mode for carrying out the present invention includes a video inputting unit, a data processing apparatus, a determination result outputting unit, and an image storage apparatus as with the third best mode for carrying out the present invention.

An identity determining program 640 is read into a data processing apparatus 600 and controls the operation of the data processing apparatus 600, whereby the result of determination that is obtained by unit of the data processing apparatus 600 is output to a determination result outputting unit 630. Under the control of the identity determining program 640, the data processing apparatus 600 performs the same processing as that of the data processing apparatus 300 according to the third best mode.

(Best Mode 7)

Next, a seventh best mode for carrying out the present invention will be described in detail with reference to the drawings.

Figure 20:
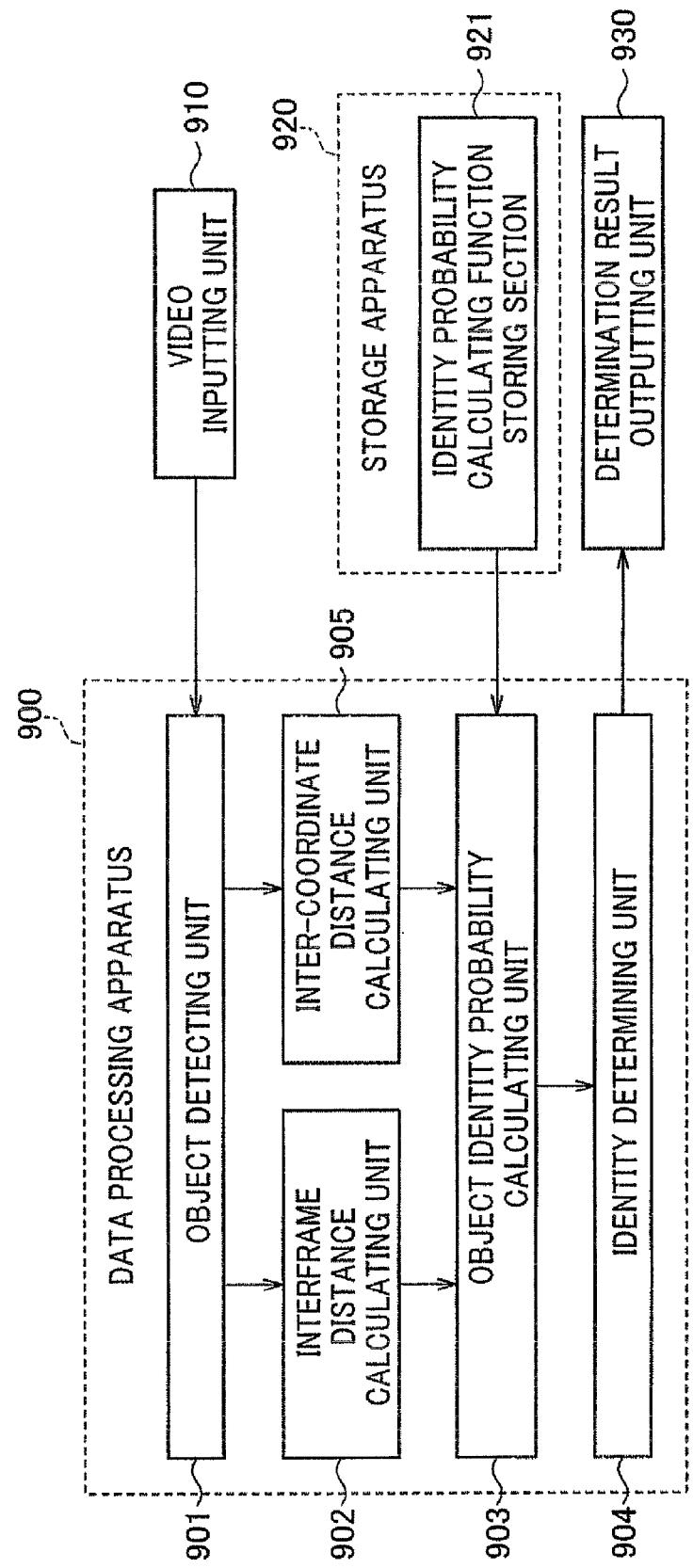
{FIG. 20} A block diagram showing the configuration of a seventh best mode for carrying out the present invention.

Referring to FIG. 20, the seventh best mode for carrying out the present invention is different from the first best mode in that a data processing apparatus 900 includes an inter-coordinate distance calculating unit 905 in addition to the configuration of the data processing apparatus 100 according to the first best mode shown in FIG. 3.

The inter-coordinate distance calculating unit 905 receives position coordinates of objects and object IDs in object-detected frames from an object detecting unit 901, and calculates inter-object coordinate distances between the objects. The inter-coordinate distance calculating unit 905 outputs the inter-coordinate distances between the objects, the pairs of frames from which the coordinate distances are calculated, and the object IDs of the objects detected from the pairs of frames to an object identity probability calculating unit 903.

Using an object identity probability calculating function selected from an identity probability calculating unit 921, the object identity probability calculating unit 903 calculates object identity probabilities between the objects that are included in the pairs of frames between which interframe distances received from an interframe distance calculating unit 902 are calculated, based on the interframe distances received from the interframe distance calculating unit 902 and the inter-coordinate distances received from the inter-coordinate distance calculating unit 905. The object identity probability calculating unit 903 outputs the object identity probabilities, the object IDs for which the object identity probabilities are calculated, and the frame numbers at which the objects are detected to the identity determining unit 904.

(Operation of Best Mode 7)

Next, the overall operation of the best mode will be described in detail with reference to FIG. 20 and the flowchart of FIG. 21.

Figure 21:
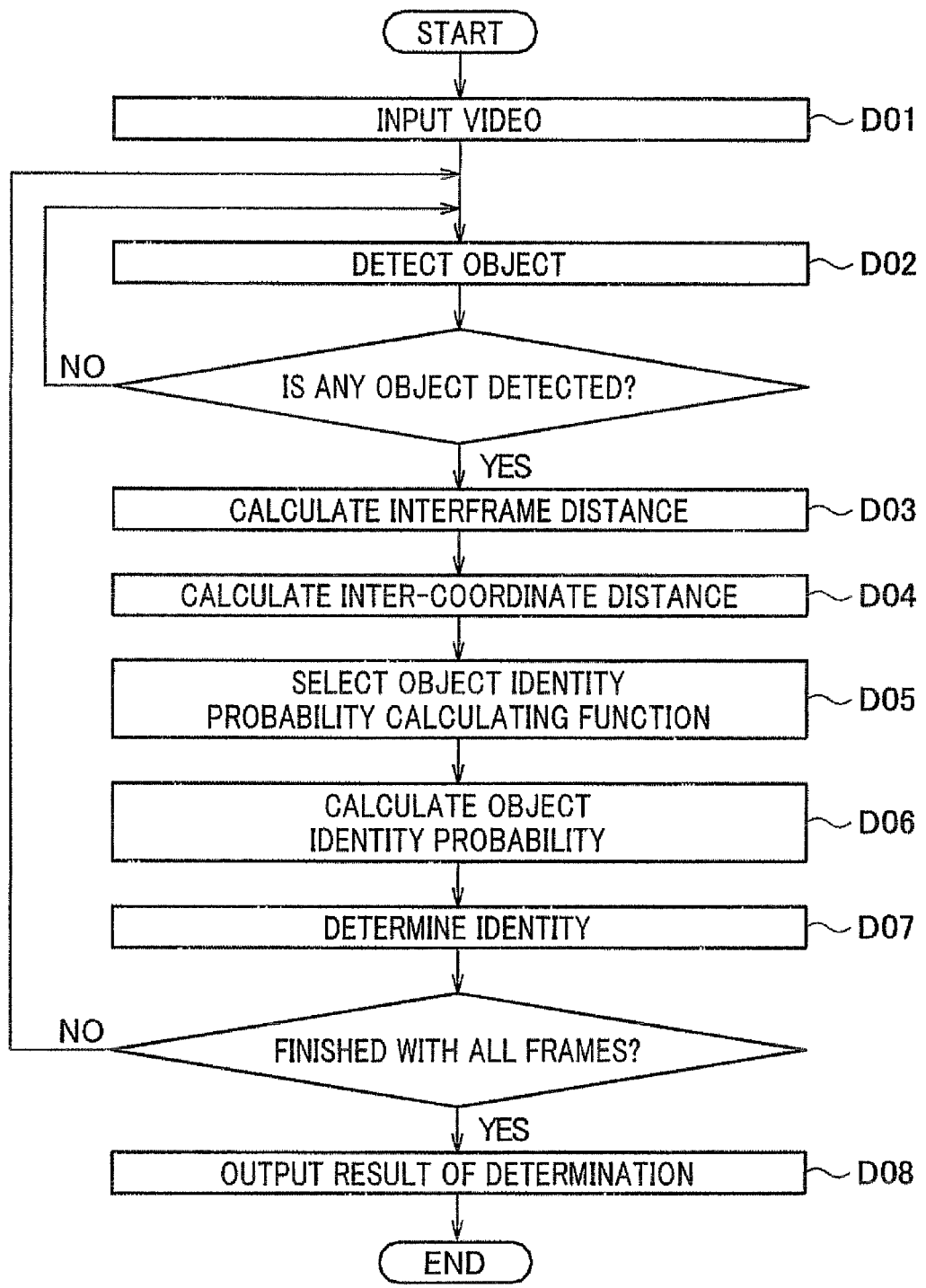
{FIG. 21} A flowchart showing the operation of the seventh best mode for carrying out the present invention.

The operation of the video inputting unit 710, the object detecting unit 701, the interframe distance calculating unit 902, the identity determining unit 904, and the determination result outputting unit 930 of the best mode shown at steps D01, D02, D03, D07, and D08 of FIG. 21 is the same as that of the unit 110, 101, 102, 104, an 130 of the first best mode. Description thereof will thus be omitted.

When an object is detected from the input frame by the object detecting unit 301, the inter-coordinate distance calculating unit 905 calculates inter-coordinate distances between the position coordinates of the object in the input frame and the position coordinates of objects in previous frames (step D04).

The object identity probability calculating unit 903 selects an object identity probability calculating function from the identity probability calculating function storing section 921 (step D05), The object identity probability calculating unit 903 calculates object identity probabilities between the objects detected from the input frame and the previous frames, based on the interframe distances calculated by the interframe distance calculating unit 902 and the coordinate distances calculated by the inter-coordinate distance calculating unit 905 (step D06).

For the object identity probability calculating function, functions that are based on the tendency of appearance of objects in an input video as described below may be used.

(1) A function based on prior knowledge that "an identical object tends to appear again in a predetermined range of position coordinates within a predetermined time"

A function that produces an increasing object identity probability with a decreasing interframe distance and a decreasing inter-coordinate distance for objects that are included in a pair of frames with an interframe distance shorter than D1 and an inter-coordinate distance shorter than d1, and produces a constant object identity probability for objects that are included in a pair of frames with an interframe distance longer than D1, is effective in determining identity between objects that are detected from a video in which the probability of an identical object appearing again within an interframe distance of D1 and within an inter-coordinate distance of d1 is high.

As an example, description will be given of identity determination on a still object in a video that is shot by switching a plurality of fixed cameras, such as a building surveillance video. The videos of the respective cameras are alternately switched at video segments D1, and stationary bodies in the camera videos appear in the respective same positions. The probability of an identical still object appearing again in the same position within an interframe distance D1 is thus high. In such cases, this function can be effectively used to determine the identity of the still object satisfactorily.

As another example, description will be given of identity determination on performers in a dialogue scene of a drama. In dramas, performers in a dialogue alternately appear in a video segment of D1 corresponding to the dialogue scene, the same performers in almost the same positions. The probability of an identical performer appearing again in almost the same position within the interframe distance D1 is thus high. In such cases, this function can be effectively used to determine the identity of the performers satisfactorily.

Figure 23:
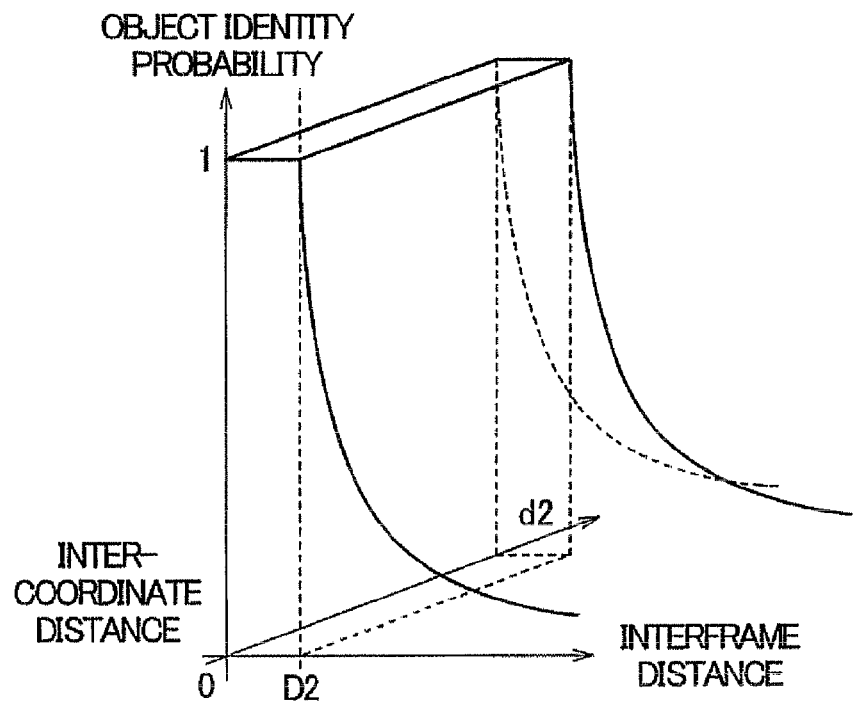
{FIG. 23} A chart showing an example of an identity probability calculating function that is based on prior knowledge that an identical object tends to appear continuously in a certain position for a certain time.

(2) A function based on prior knowledge that "an identical object tends to appear continuously in a certain position for a certain time" (FIG. 23)

A function that produces an object identity probability of constant high value for objects that are included in a pair of frames with an interframe distance shorter than D2 and have an inter-coordinate distance shorter than d2, and produces a decreasing object identity probability with an increasing interframe distance for objects that are included in a pair of frames with an interframe distance longer than D2 or have an inter-coordinate distance longer than d2, is effective in determining identity between objects that are detected from a video in which the probability of an identical object appearing again within an interframe distance of D2 and within an inter-coordinate distance of d2 is high.

As an example, description will be given of identity determination on persons in a video in which persons entering an entrance gate one after another are kept track of and shot in succession by a movable surveillance camera that is installed on the gate. In the video, an identical person appears continuously in the same position for a continuous video segment D2 from when the person appears until he/she walks away. The probability of an identical person appearing in the same position in an interframe distance D2 is thus high.

In such cases, this function can be effectively used to determine the identity of persons satisfactorily.

Figure 24:
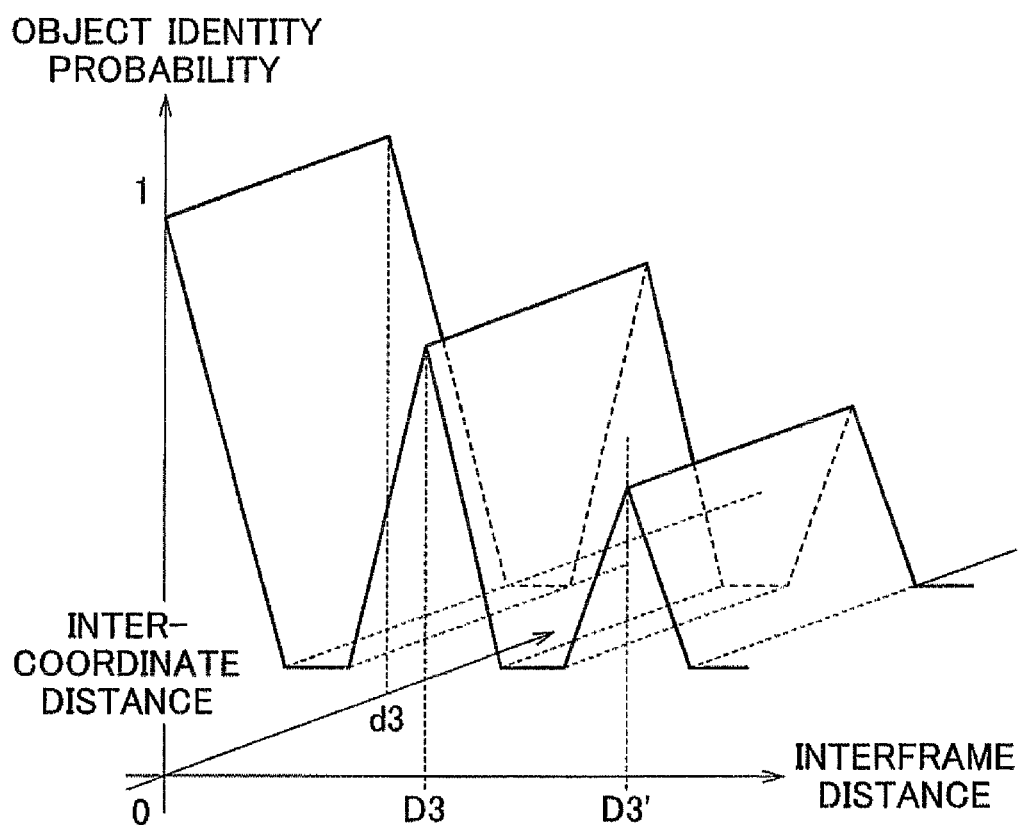
{FIG. 24} A chart showing an example of an identity probability calculating function that is based on prior knowledge that an identical object tends to appear again in almost the same position after a certain time.

(3) A function based on prior knowledge that "an identical object tends to appear again in almost the same position after a certain time" (FIG. 24)

A function that produces an object identity probability of high value for objects that are included in a pair of frames with an interframe distance of D3 or D3' and fall within an inter-coordinate distance of d3, and produces a decreasing identity probability with an increasing distance from the interframe distance D3 or D3', is effective in determining identity between objects that are detected from a video in which the probability of an identical object appearing again in almost the same position after certain times of D3 and D3' is high.

As an example, description will be given of identity determination on parked vehicles in a video in which streets are shot with rotating surveillance cameras. When the surveillance cameras are rotated at constant speed, an identical vehicle appears each time a certain camera shoots a certain direction. For example, when the camera makes a single turn in a time of D3, the probability of an identical vehicle appearing in the same position again D3 and D3' after the appearance of the vehicle in the video. In such cases, this function can be effectively used to determine the identity of vehicle bodies satisfactorily.

The steps D02 to D07 are performed on all the frames that constitute the input video.

Next, the effects of the best mode will be described.

With the conventional techniques, the identity of objects has been determined based on the similarity of features extracted from the objects. In contrast, according to the best mode, the identity of a pair of objects is determined based on an object identity probability that is calculated based on the interframe distance between the frames from which the respective objects are detected, and the coordinate distance. Since the object identity probability can be calculated based on the probability as to how long interframe distance and how large displacement an identical object appears with in the input video, there is provided the effect that determination can be made according to the scenario of the input video.

The conventional techniques have been predicated on that identical objects are in positions temporally close to each other, and objects have not been determined to be identical if the interframe distance therebetween is farther than or equal to a predetermined threshold. In contract, the best mode has the effect that even a pair of objects that are temporally apart from each other can be determined to be identical if the object identity probability that is calculated based the interframe distance and the inter-coordinate distance between the pair of objects is high.

In the best mode, object identity probability calculating functions can be stored in advance, and an appropriate function can be selected from among the stored functions depending on the video. For example, when determining the identity of performers in the video of a single episode of a drama series, it is possible to select an appropriate function from among the functions stored in the object identity probability storing section or combine the stored functions to generate an optimum function based on the times necessary between when performers appear and when they appear again, displacements with which the performers appear again, and the frequencies thereof, which are determined from the videos of previous episodes. The object identity probability calculating function selected or generated in this way can be used to calculate object identity probabilities, with the effect that the identity of performers can be determined with high accuracy.

EXAMPLES

Example 1

Now, operation in the best modes for carrying out the present invention will be described with specific examples. Such a best mode 1 corresponds to the first best mode for carrying out the present invention.

Figure 17:
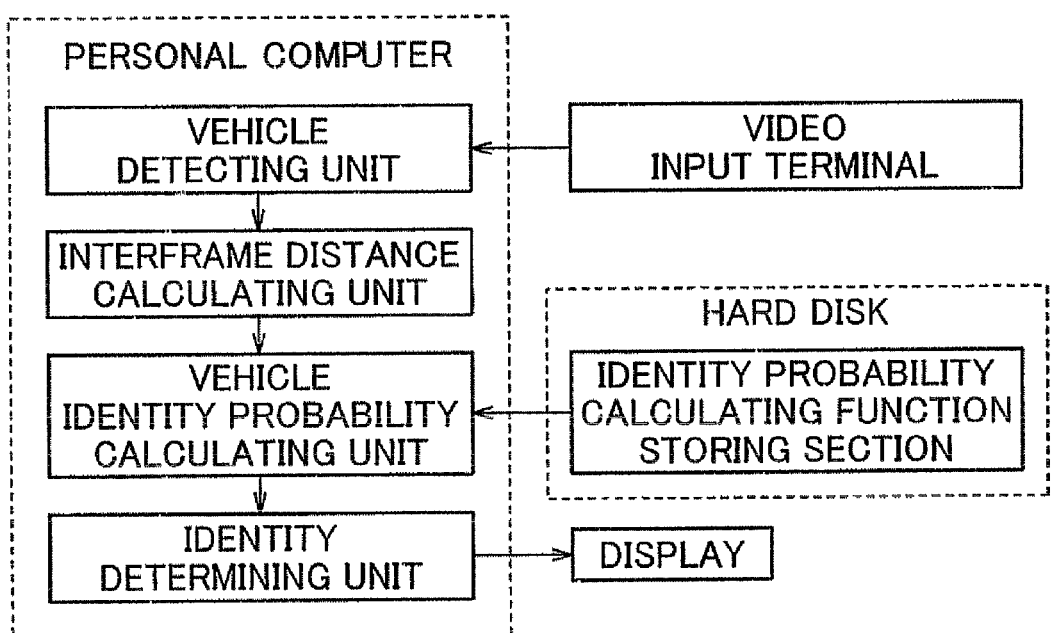
{FIG. 17} A block diagram showing the configuration of Example 1.

Example 1 will deal with the case where the identity determination apparatus of the present invention is used to determine identity between a group of vehicle bodies that appear in an input video. That a group of vehicle bodies are identical may refer to that the group of vehicle bodies detected from the video are an identical vehicle, or may refer to that the group of vehicle bodies are of the same model. In the present example, an identical vehicle shall be intended. As shown in FIG. 17, the present example includes a video input terminal as a video inputting unit, a hard disk as a storage apparatus, a personal computer as a data processing apparatus, and a display as a video output apparatus.

The personal computer has a central processing unit which functions as a vehicle detecting unit, an interframe distance calculating unit, a vehicle identity probability calculating unit, and an identity determining unit.

Suppose now that each frame constituting a video is input from the video input terminal. The vehicle detecting unit of the central processing unit detects a vehicle from the input frame, and acquires the frame number at which the vehicle is detected. For example, the vehicle detecting unit may contain a group of images of various vehicle models as templates, and determine the presence of a vehicle in the input frame if a difference between a template and the input frame is smaller than or equal to a threshold. An alternative technique may include storing image features of vehicles such as shapes, colors, and textures extracted from a group of images of various vehicle models in advance, and determining the presence of a vehicle if similar features are extracted from the input frame. Another alternative technique may include storing motion features of vehicle bodies extracted from videos of various vehicle models in advance, and determining the presence of a vehicle in the input frame if an image area in the input frame has a motion feature similar to stored one. Vehicle bodies may be detected by using the techniques of the examples described above, or by applying other techniques.

When a vehicle is detected from the input frame, the interframe distance calculating unit calculates interframe distances between the input frame and a group of all previous frames from which vehicle bodies are detected. For example, the interframe distances may be differences between the frame number of the input frame and the frame numbers of the previous frames from which vehicle bodies are detected. Alternatively, the interframe distances may be differences between the actual shot time of the input frame and the shot times of the previous frames from which vehicle bodies are detected. The interframe distances of the above-described examples may be used. Other distances may be applied.

The vehicle identity probability calculating unit calculates the vehicle identity probabilities between the vehicle detected from the input frame and the group of vehicle bodies detected from the group of previous frames based on the interframe distances received from the interframe distance calculating unit, using an object identity probability calculating function selected from an identity probability calculating function storing section in the hard disk. For vehicle identity probability calculating functions, the functions shown in FIGS. 6 to 9 may be used. Other function may be used.

The identity determining unit determines the identity between the vehicle detected from the input frame and the group of vehicle bodies detected from the group of previous frames based on the vehicle identity probabilities received from the vehicle identity probability, and assigns an identical group ID to identical vehicle bodies. If a vehicle in a previous frame is calculated to have a vehicle identity probability higher than or equal to a predetermined threshold based on the interframe distance from the input frame, the identity determining unit determines that the vehicle is identical to the vehicle detected from the input frame. Based on the result of determination between the vehicle detected from the input frame and the group of vehicle bodies detected from the group of previous frames, the identity determining unit also updates the result of identity determination that has been obtained from among the group of vehicle bodies detected from the group of previous frames.

The display outputs the result of identity determination between the vehicle bodies received from the identity determining unit. The result of identity determination may be output in the table form shown in FIG. 26 or in other forms.

Example 2

Example 2 will deal with the case where the identity determination apparatus of the present invention is used to determine identity between moving bodies that appear in an input video. In the present example, a moving object shall refer to one that is capable of autonomous movement such as a person, a vehicle, and an animal. That moving bodies are identical shall refer to that the moving bodies are of the same kind like persons. Such an example corresponds to the second best mode for carrying out the present invention.

Figure 18:
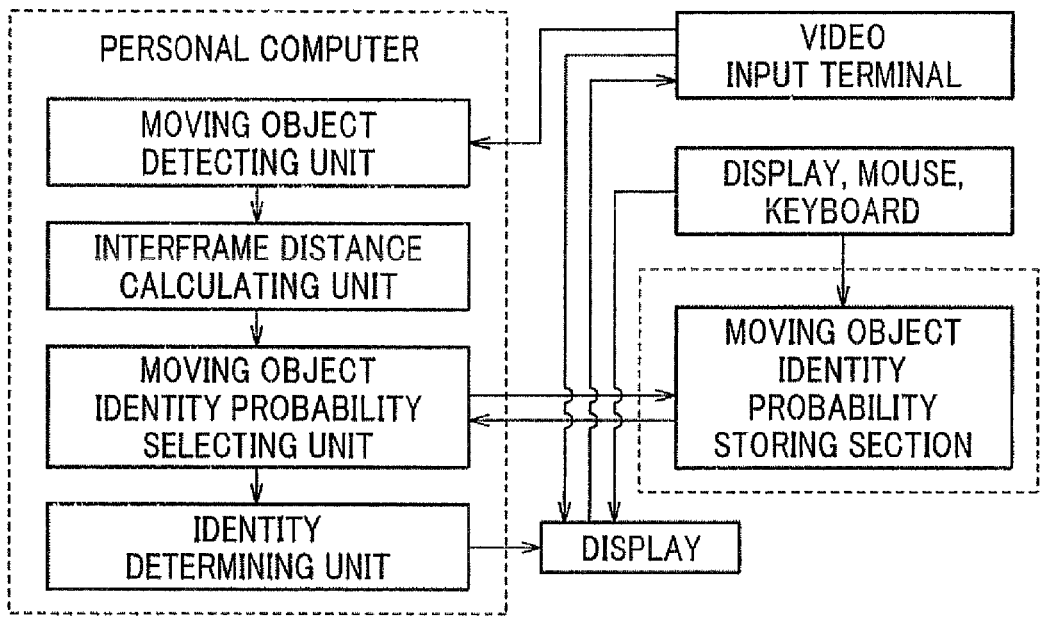
{FIG. 18} A block diagram showing the configuration of Example 2.

As shown in FIG. 18, the present example includes a video input terminal as a video inputting unit, a display and a keyboard as a command input apparatus, a personal computer as a data processing apparatus, a hard disk as a storage apparatus, and a display as a video output apparatus.

The personal computer has a central processing unit which functions as a moving object detecting unit, an interframe distance calculating unit, a moving object identity probability calculating unit, and an identity determining unit.

The user initially stores a correspondence table of interframe distances and moving object identity probabilities into an object identity probability storing section by using the display, a mouse, and the keyboard.

The video input terminal inputs each frame that constitutes an input video to the moving object detecting unit.

The moving object detecting unit detects a moving object from the input frame, and inputs the frame number of the frame from which the moving object is detected to the interframe distance calculating unit.

As for the technique of detecting a moving object, for example, the moving object detecting unit estimates camerawork by statistically processing the displacements of image regions from the previous frame to the next frame of the input frame, and determines the presence of a moving object in the input frame if an area different from the camerawork is detected. With an input video that has an unchanging background such as a room surveillance video, the moving object detecting unit contains image information on the background area in advance, and determines that a moving object is detected when an image area not included in the background area is detected from the input frame. The moving object detecting unit may use the foregoing techniques or other techniques.

When a moving object is detected from the input frame, the interframe distance calculating unit calculates interframe distances between the input frame and a group of previous frames from which moving bodies are detected.

The moving object identity probability selecting unit selects moving object identity probabilities from the correspondence table of interframe distances and moving object identity probabilities stored in the moving object identity probability storing section based on the interframe distances received from the interframe distance calculating unit, and determines moving object identity probabilities between the moving object detected from the input frame and the group of moving bodies detected from the previous frames.

If a moving object identity probability received from the moving object identity probability selecting unit is higher than or equal to a predetermined threshold, the identity determining unit determines that the moving object in the previous frame of which the moving object identity probability is selected and the moving object in the input frame are identical. Based on the result of identity determination between the moving object detected from the input frame and the group of moving bodies detected from the previous frames, the identity determining unit also updates the result of identity determination that has been obtained from among the group of moving bodies detected from the group of previous frames.

The display provides a display based on the result of determination received from the identity determining unit. The displayed may be in the form shown in FIG. 26 or in other forms.

Based on the result of determination displayed on the display, the user selects a desired group of moving bodies by using the mouse or keyboard. The display plays a video inputted from the video input terminal, starting from the frame where a moving object belonging to the user-selected group appear. This makes it possible for the user to search and view the point where a selected kind of moving bodies appear.

Example 3

Example 3 will deal with the case where the identity determination apparatus of the present invention is used to determine identity between persons who appear in an input video. That persons are identical, in the present example, shall refer to that persons detected from the input video are an identical person. Such an example corresponds to invention.

Figure 19:
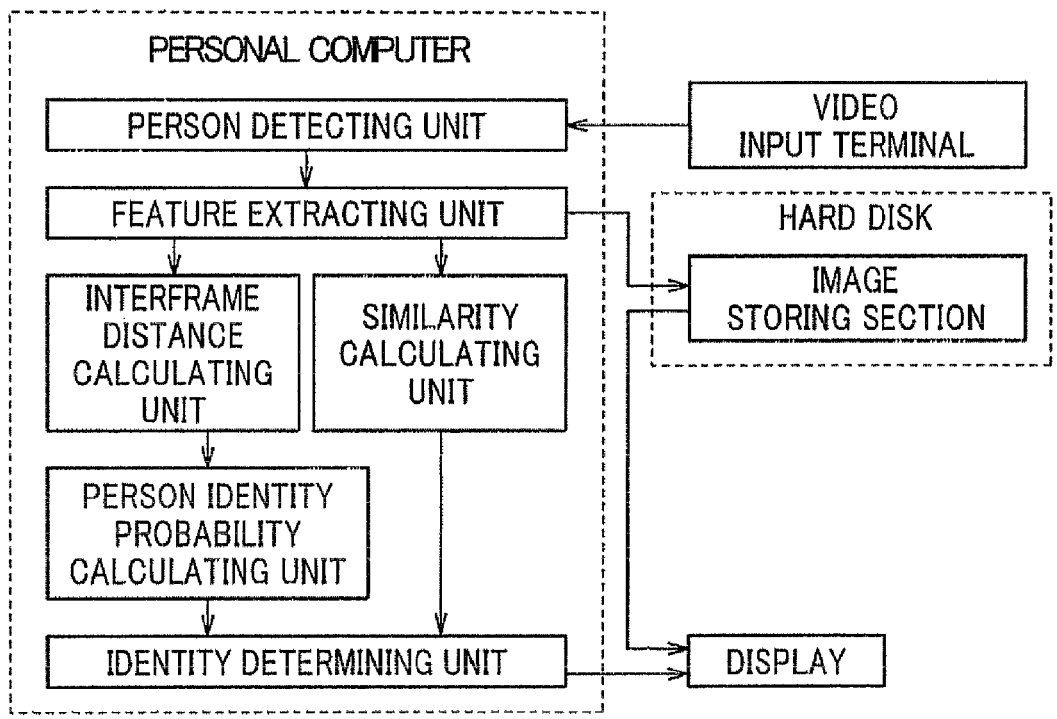
{FIG. 19} A block diagram showing the configuration of Example 3.

As shown in FIG. 19, the present example includes a video input terminal as a video inputting unit, a personal computer as a data processing apparatus, a hard disk as an image storage apparatus, and a display as a video output apparatus.

The personal computer has a central processing unit which functions as a person detecting unit, a feature extracting unit, an interframe distance calculating unit, a similarity calculating unit, a person identity probability calculating unit, and an identity determining unit.

Suppose now that a video is input from the video input terminal. The person detecting unit of the central processing unit detects a person from each frame of the input video, and inputs the person-detected frame to the feature extracting unit.

The unit for detecting a person may use information that is obtained from an entire person area. For example, the person detecting unit may contain images of various persons as templates, and determine the presence of a person in an input image if a difference between the input image and a template is smaller than or equal to a certain threshold. In another technique, the person detecting unit may contain color information such as skin color and combined models of edge directions and densities in advance, and determine the presence of a person if an area similar to a model is detected from the input frame.

Techniques that utilize persons' facial information may also be used. Examples of the techniques, as described in Non-Patent Literature 1, include: a technique of performing a face detection using templates that are created by using the fact that faces (heads) have elliptic outlines and eyes and mouths have oblong shapes; a face detection technique using brightness distribution characteristics such that cheek and forehead areas are high in brightness and eye and mouth areas are low in brightness; and a technique of performing a face detection by using the symmetry of a face, and the area and position of skin color. Techniques that statistically learn distributions of features acquired from a large number of learning samples including human faces and non-facial samples and determine which distribution a feature obtained from an input image belongs to, facial or non-facial, include ones using a neural network, a support vector machine, an Ada-Boost method, etc. A person may be determined to be present in the input frame when a person's face is detected from the input frame by using the techniques of the examples described above or other techniques.

Persons may be detected by using the techniques of the examples described above, or by applying other techniques.

The feature extracting unit extracts the frame number of the frame input from the person detecting unit, the image area of the person, and personal features extracted from the image area. The feature extracting unit outputs the frame number to the interframe distance calculating unit, stores the image area of the person into an image storing section in the hard disk, and stores personal features into a frame storing section in the hard disk.

The features of a person, for example, may be color information on the clothes the person wears, edge directions and density information on the entire area of the person, or facial features of the person.

Examples of the features of a human face, as described in Non-Patent Literature 2, include: a feature vector that numerically describes the shapes, position relationship, and the like of eyes, a nose, and a mouth by making use of knowledge on facial structures; a feature vector that expresses tone values of respective pixels of a face in a two-dimensional array; and a feature vector called Gabor jet which can express the local periodicity and directionality of a pattern that is obtained by performing a wavelet transformation on each feature point of a face. Similarity between persons may be determined by using the features of human faces of the above-described examples or by applying other techniques.

The similarity calculating unit calculates similarity between the features of the person in the input frame received from the feature extracting unit and the features of persons in previous frames. For example, the similarity is determined by differences between the feature vector of the human face detected from the input frame and the feature vectors of a group of human faces detected from the previous frames.

The interframe distance calculating unit calculates interframe distances between the input frame received from the feature extracting unit and a group of all pervious frames from which persons are detected. The interframe distances may be medium times that are calculated from differences between the frame numbers of the input frame and the previous frames, or scenario times that are calculated from differences between times on a script to which the respective frame numbers of the input frame and the previous frames correspond. The interframe distances may be medium times or scenario times that are weighted based on any one or a combination of a shot change, a camerawork change, a scene change, a BGM change, and a change in an image feature of the background.

The person identity probability calculating unit calculates person identity probabilities between the person in the input frame and the persons in the previous frames based on the interframe distances received from the interframe distance calculating unit. For example, the person identity probabilities may be calculated based on the interframe distances by using the identity probability calculating functions shown in FIGS. 6 to 9, or by other techniques.

The identity determining unit determines the identity of the persons based on the person identity probabilities calculated between the person in the input frame and the persons in the previous frames, received from the person identity probability calculating unit, and the similarity calculated between the person in the input frame and the persons in the previous frames, received from the similarity calculating unit. For example, the person in the input frame and the person in a previous frame may be determined to be identical when the product of the person identity probability and the similarity is greater than or equal to a threshold. The persons may be determined to be identical when both the person identity probability and the similarity are higher than or equal to thresholds. Other determination methods may be used. Based on the result of determination between the person detected from the input frame and the group of persons detected from the group of previous frames, the identity determining unit updates the result of identity determination that has been obtained from among the group of persons detected from the group of previous frames.

The display shows the result of determination received from the identity determining unit and the image area of the object stored in the image storing section in combination. The result of determination may be presented in a table form such as shown in FIG. 28, or may be presented by other techniques. In the form of FIG. 28, identical persons are grouped into a group of the same ID. The image data field provides a list of various image areas of various persons detected from the video.

Example 4

Example 4 will deal with the case where the identity determination apparatus of the present invention is used to determine identity between persons based on the faces of the persons appearing in an input video. That persons are identical, in the present example, shall refer to that the faces of the persons detected from the input video are of an identical person. Such an example corresponds to the seventh best mode for carrying out the present invention.

Figure 25:
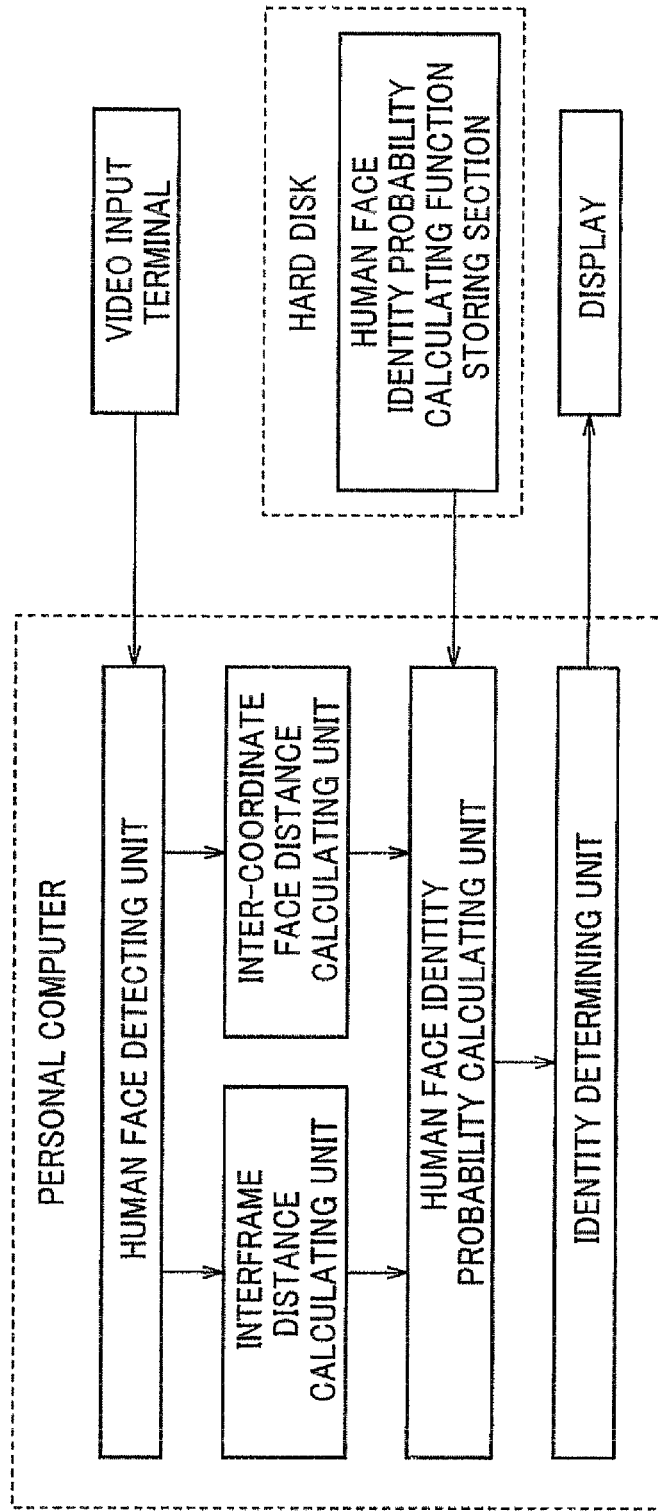
{FIG. 25} A block diagram showing the configuration of Example 4.

As shown in FIG. 25, the present example includes a video input terminal as a video inputting unit, a hard disk as a storage apparatus, a personal computer as a data processing apparatus, and a display as a video output apparatus.

The personal computer has a central processing unit which functions as a human face detecting unit, an interframe distance calculating unit, an inter-coordinate face distance calculating unit, a human face identity probability calculating unit, and an identity determining unit. The hard disk includes a human face identity probability calculating function storing section.

Suppose now that each frame constituting a video is input from the video input terminal. The human face detecting unit of the central processing unit detects a person's face from the input frame, and acquires the frame number at which the person's face is detected. The human face detecting unit also judges a unique ID to each human face detected. The human face detecting unit outputs the frame number and the human face ID to the interframe distance calculating unit.

When a person's face is detected from the input frame, the interframe distance calculating unit calculates interframe distances between the input frame and a group of all previous frames from which persons' faces are detected, and outputs the interframe distances to the human face identity probability calculating unit. The interframe distance calculating unit outputs combinations of the frame numbers of all the pairs of frames between which the interframe distances are calculated to the inter-coordinate face distance calculating unit.

When a person's face is detected from the input frame, the inter-coordinate face distance calculating unit calculates inter-coordinate face distances between the input frame and the group of all previous frames from which persons' faces are detected, by using the position coordinates of the object in the input frame and the position coordinates of the objects in the previous frames. The inter-coordinate face distance calculating unit inputs the inter-coordinate face distances to the human face identity probability calculating unit. Face coordinates may be coordinates corresponding to the barycenter of a face area in the input frame, or the coordinates of one or a plurality of feature points (such as eye corners, pupil centers, nostrils, mouth corners, and the corners of eyebrows) feature points among facial features. An inter-coordinate distance may be a distance that is calculated between corresponding position coordinates, or a distance calculated through a linear operation on distances that are respectively calculated between a corresponding plurality of position coordinates. For example, using the blackish centers of both eyes as the face coordinates, an inter-coordinate face distance Dij between human faces included in frames i and j may be determined by the following:

{Eq. 1}

$$D_{ij} = \sqrt{(R_{ix}-R_{jx})^2+(R_{iy}-R_{jy})^2} + \sqrt{(L_{ix}-L_{jx})^2+(L_{iy}-L_{jy})^2} \quad (1)$$

where (Rix, Riy) is the pupil center of the right eye in the frame i, and (Lix, Liy) is the pupil center of the left eye.

Figure 22:
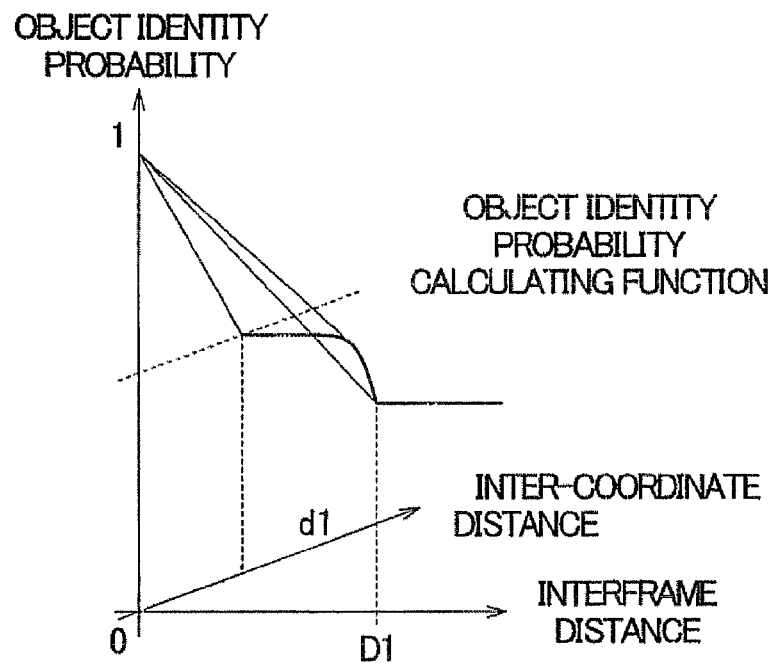
{FIG. 22} A chart showing an example of an identity probability calculating function that is based on prior knowledge that an identical object tends to appear again in a predetermined range of position coordinates within a predetermined time.

The human face identity probability calculating unit calculates human face identity probabilities between human faces included in respective frames in the pairs of frames between which the interframe distances received from the interframe distance calculating unit are calculated. The human face identity probabilities are calculated by using a human face identity probability calculating function selected from the human face identity probability calculating unit, based on the interframe distances obtained from the interframe distance calculating unit and the inter-coordinate face distances obtained from the inter-coordinate face distance calculating unit. For human face identity probability calculating functions, the functions shown in FIGS. 22 to 24 may be used. Other function may also be used. The human face identity probability calculating unit outputs the human face identity probabilities, person IDs for which the human face identity probabilities are calculated, and the frame numbers at which the objects are detected to the identity determining unit.

The identity determining unit determines the identity between the human face detected from the input frame and the group of human faces detected from the group of previous frames based on the human face identity probabilities received from the human face identity probability calculating unit, and assigns an identical group ID to identical persons. If a human face in a previous frame is calculated to have a human face identity probability higher than or equal to a predetermined threshold based on the interframe distance and the inter-coordinate face distance from the input frame, the identity determining unit determines that the human face is identical to the human face detected from the input frame. Based on the result of determination between the human face detected from the input frame and the group of human faces detected from the group of previous frames, the identity determining unit also updates the result of identity determination between the group of human faces that has been obtained from among the group of human faces detected from the group of previous frames.

The display outputs the result of identity determination between the persons received from the identity determining unit. The result of identity determination may be output in the table form shown in FIG. 26, or in other forms.

The typical embodiments of the present invention have been described in detail. However, it is to be understood that various changes, substitutions, and alternatives can be made without departure from the spirit and the scope of the invention defined in the claims. Moreover, the inventor contemplates that an equivalent range of the claimed invention is kept even if the claims are amended in proceedings of the application.

INDUSTRIAL APPLICABILITY

The present invention can be applied to an identity determination apparatus for determining identity of objects and a program for implementing the identity determination apparatus on a computer for the purposes of: creating a list of objects appearing in a video, classified by object; searching and reproducing the points of appearance of objects; creating a summarized video in which the points of appearance of desired objects are spliced; or classifying videos based on objects. The present invention can also be applied to an identity determination apparatus for arranging and classifying home videos based on persons, and creating videos to view. The present invention can also be applied to an object identity determination apparatus for listing the points of appearance of respective persons so as to grasp in a short time which person appears how often in a video that is shot by a surveillance camera for a long period of time. The present invention can also be applied to an object identity determination apparatus for listing the points of appearance of objects and a program for implementing the identity determination apparatus on a computer for the sake of selecting videos based on the objects for editing purposes in a system that performs video editing with a large number of videos.

The invention claimed is:
1. An identity determination apparatus comprising:
a processor configured to:
   detect a plurality of objects from an input video by using pattern recognition techniques with templates;
   calculate an interframe distance between frames from which the objects are detected, the interframe distance being a time distance between frames from which the respective objects are detected;
   calculate an object identity probability by using the calculated interframe distance and a relationship between the interframe distance and the object identity probability, the relationship being preliminarily set on a basis of a scenario of the input video; and
   determine identity of the objects based on a comparison between the calculated object identity probability and a threshold, wherein the determined identity of the objects is updated when a new frame having a detected object is processed, the determined identity is based on a first group of frames, the update being based on frames including at least part of the first group of frames and the new frame, and wherein when a result of the determined identity based on the first group of frames is not consistent with a result of a determined identity of the objects based on the at least part of the first group of frames and the new frame, the update includes replacing the result of the determined identity based on the first group of frames with the result of the determined identity based on the at least part of the first group of frames and the new frame.

2. The identity determination apparatus according to claim 1, wherein the relationship between the interframe distance and the object identity probability is based on a previously-stored correspondence table of interframe distances and object identity probabilities.

3. The identity determination apparatus according to claim 1, wherein the processor determines identity between objects included in a pair of frames by using similarity that is based on image features or sound features of the objects or a combination thereof aside from the object identity probability.

4. The identity determination apparatus according to claim 1, wherein the processor determines identity between objects included in a pair of frames by using a product which is obtained by multiplying the object identity probability and similarity that is based on image features or sound features of the objects or a combination thereof.

5. The identity determination apparatus according to claim 1, wherein the interframe distance is a medium time calculated based on a difference between frame numbers.

6. The identity determination apparatus according to claim 1, wherein the interframe distance is a scenario time calculated based on a difference between times on a script to which the frames correspond.

7. The identity determination apparatus according to claim 5, wherein the interframe distance is a medium time that is weighted based on any one or a combination of a shot change, a camerawork change, a scene change, a BGM change, and a change in an image feature of a background.

8. The identity determination apparatus according to claim 1, wherein the objects are a part of each frame.

9. The identity determination apparatus according to claim 1, wherein the objects are persons.

10. The identity determination apparatus according to claim 9, wherein an object identity probability between a plurality of persons detected from the same frame is 0.

11. The identity determination apparatus according to claim 1, wherein the processor further determines identity between the plurality of objects detected from the input video by using an object identity probability determined based on the interframe distance and an inter-coordinate distance, the interframe distance being a time distance between the frames from which the respective objects are detected, and the inter-coordinate distance being a distance between position coordinates of the objects on the respective frames.

12. The identity determination apparatus according to claim 11, wherein the processor is further configured to:
calculate an inter-coordinate distance between objects detected;
calculate an object identity probability by using the interframe distance and the inter-coordinate distance and an object identity probability calculating function, the object identity probability calculating function being preliminarily set on a basis of a scenario of the input video; and determine identity of the objects based on the object identity probability.

13. The identity determination apparatus according to claim 11, wherein the processor is further configured to:
calculate an inter-coordinate distance between objects detected;
select an object identity probability from a previously-stored correspondence table of interframe distances, inter-coordinate distances, and object identity probabilities based on the interframe distance calculated and the inter-coordinate distance calculated; and
determine identity of the objects based on the object identity probability.

14. The identity determination apparatus according to claim 12, wherein the processor determines identity between objects included in a pair of frames by using similarity that is based on image features or sound features of the objects or a combination thereof aside from the object identity probability.

15. The identity determination apparatus according to claim 12, wherein the processor determines identity between objects included in a pair of frames by using a product which is obtained by multiplying the object identity probability and similarity that is based on image features or sound features of the objects or a combination thereof.

16. The identity determination apparatus according to claim 11, wherein the inter-coordinate distance is a distance calculated between coordinates corresponding to barycenters of image areas of the respective objects.

17. The identity determination apparatus according to claim 11, wherein the inter-coordinate distance is a distance calculated as to one or a plurality of feature points in an image area of a first object of the plurality of objects and one or a plurality of feature points in an image area of a second object of the plurality of objects, through a linear operation between coordinates of the respective corresponding feature points.

18. The identity determination apparatus according to claim 11, wherein the objects are faces of persons.

19. The identity determination apparatus according to claim 11, wherein the inter-coordinate distance is a distance calculated through a linear operation between position coordinates of both eyes in either one of a pair of frames and position coordinates of both eyes in the other frame.

20. An identity determination method characterized by determining identity between a plurality of objects detected from an input video by comparing an object identity probability determined based on an interframe distance with a threshold using a processor, the interframe distance being a time distance between frames from which the respective objects are detected, the method comprising the steps of:
(a) detecting a plurality of objects from an input video by using pattern recognition techniques with templates;
(b) calculating an interframe distance between frames from which the objects are detected;
(c) calculating an object identity probability by using the interframe distance and a relationship between the interframe distance and the object identity probability, the relationship being preliminarily set on a basis of a scenario of the input video; and
(d) determining identity of the objects by comparing the object identity probability with a threshold,
wherein the determined identity of the objects is updated when a new frame having a detected object is processed, the determined identity is based on a first group of frames, the update being based on frames including at least part of the first group of frames and the new frame, and wherein when a result of the determined identity based on the first group of frames is not consistent with a result of a determined identity of the objects based on the at least part of the first group of frames and the new frame, the update includes replacing the result of the determined identity based on the first group of frames with the result of the determined identity based on the at least part of the first group of frames and the new frame.

21. An identity determination method characterized by determining identity between a plurality of objects detected from an input video by comparing an object identity probability determined based on an interframe distance with a threshold using a processor, the interframe distance being a time distance between frames from which the respective objects are detected, the method comprising the steps of:
 a) detecting a plurality of objects from an input video by using pattern recognition techniques with templates;
 b) calculating an interframe distance between frames from which the objects are detected;
 c) selecting an object identity probability from a previously-stored correspondence table of interframe distances and object identity probabilities based on the interframe distance calculated; and
 d) determining identity of the objects by comparing the object identity probability with a threshold, wherein the determined identity of the objects is updated when a new frame having a detected object is processed, the determined identity is based on a first group of frames, the update being based on frames including at least part of the first group of frames and the new frame, and wherein when a result of the determined identity based on the first group of frames is not consistent with a result of a determined identity of the objects based on the at least part of the first group of frames and the new frame, the update includes replacing the result of the determined identity based on the first group of frames with the result of the determined identity based on the at least part of the first group of frames and the new frame.

22. The identity determination method according to claim 20, wherein in the step d), identity between objects included in a pair of frames is determined by using similarity that is based on image features or sound features of the objects or a combination thereof aside from the object identity probability.

23. The identity determination method according to claim 20, wherein in the step d), identity between objects included in a pair of frames is determined by using a product which is obtained by multiplying the object identity probability and similarity that is based on image features and sound features of the objects or a combination thereof.

24. The identity determination method according to claim 20, wherein the interframe distance is a medium time calculated based on a difference between frame numbers.

25. The identity determination method according to claim 20, wherein the interframe distance is a scenario time calculated based on a difference between times on a script to which the frames correspond.

26. The identity determination method according to claim 24, wherein the interframe distance is a medium time that is weighted based on any one or a combination of a shot change, a camerawork change, a scene change, a BGM change, and a change in an image feature of a background.

27. The identity determination method according to claim 20, wherein the objects are a part of each frame.

28. The identity determination method according to claim 20, wherein the objects are persons.

29. The identity determination method according to claim 28, wherein an object identity probability between a plurality of persons detected from the same frame is 0.

30. The identity determination method according to claim 20, wherein identity between the plurality of objects detected from the input video is determined by using an object identity probability determined based on the interframe distance and an inter-coordinate distance, the interframe distance being a distance between the frames from which the respective objects are detected, the inter-coordinate distance being a distance between position coordinates of the objects on the respective frames.

31. The identity determination method according to claim 30, further comprising the steps of:
 e) detecting a plurality of objects from an input video by using pattern recognition techniques with templates;
 f) calculating an interframe distance between frames from which the objects are detected;
 g) calculating an inter-coordinate distance between objects detected;
 h) calculating an object identity probability by using the interframe distance and the inter-coordinate distance and an object identity probability calculating function, the object identity probability calculating function being preliminarily set on a basis of a scenario of the input video; and
 i) determining identity of the objects based on the object identity probability.

32. The identity determination method according to claim 30, further comprising the steps of:
 e) detecting a plurality of objects from an input video by using pattern recognition techniques with templates;
 f) calculating an interframe distance between frames from which the objects are detected;
 g) calculating an inter-coordinate distance between objects detected;
 h) selecting an object identity probability
from a previously-stored correspondence table of interframe distances, inter-coordinate distances, and object identity probabilities based on the interframe distance calculated and the inter-coordinate distance calculated; and
 i) determining identity of the objects based on the object identity probability.

33. The identity determination method according to claim 31, wherein in the step i), identity between objects included in a pair of frames is determined by using similarity that is based on image features or sound features of the objects or a combination thereof aside from the object identity probability.

34. The identity determination method according to claim 31, wherein in the step i), identity between objects included in a pair of frames is determined by using a product of the object identity probability and similarity that is based on image features or sound features of the objects or a combination thereof.

35. The identity determination method according to claim 30, wherein the inter-coordinate distance is a distance calculated between coordinates corresponding to barycenters of image areas of the respective objects.

36. The identity determination method according to claim 30, wherein the inter-coordinate distance is a distance calculated as to one or a plurality of feature points in an image area of a first object of the plurality of objects and one or a plurality of feature points in an image area of a second object of the plurality of objects, through a linear operation between coordinates of the respective corresponding feature points.

37. The identity determination method according to claim 30, wherein the objects are faces of persons.

38. The identity determination method according to claim 30, wherein the inter-coordinate distance is a distance calculated through a linear operation between position coordinates of both eyes in either one of a pair of frames and position coordinates of both eyes in the other frame.

39. An identity determining computer program product, embodied on a non-transitory computer-readable medium, which when executed by a computer causes the computer to:
  determine identity between a plurality of objects detected from an input video by comparing an object identity probability determined based on an interframe distance with a threshold, the interframe distance being a time distance between frames from which the respective objects are detected, wherein the identity determining computer program product, which when executed by the computer further causes the computer to:
  detect the plurality of objects from the input video by using pattern recognition techniques with templates;
  calculate the interframe distance between frames from which the objects are detected;
  calculate the object identity probability by using the interframe distance and a relationship between the interframe distance and the object identity probability, the relationship being preliminarily set on a basis of a scenario of the input video; and
  determine the identity of the objects by comparing the object identity probability with the threshold,
wherein the determined identity of the objects is updated when a new frame having a detected object is processed, the determined identity is based on a first group of frames, the update being based on frames including at least part of the first group of frames and the new frame, and wherein when a result of the determined identity based on the first group of frames is not consistent with a result of a determined identity of the objects based on the at least part of the first group of frames and the new frame, the update includes replacing the result of the determined identity based on the first group of frames with the result of the determined identity based on the at least part of the first group of frames and the new frame.

40. An identity determining computer program product, embodied on a non-transitory computer-readable medium, which when executed by a computer causes the computer to:
  determine identity between a plurality of objects detected from an input video by comparing an object identity probability determined based on an interframe distance with a threshold, the interframe distance being a time distance between frames from which the respective objects are detected, wherein the identity determining computer program product, which when executed by the computer further causes the computer to:
  detect a plurality of objects from an input video by using pattern recognition techniques with templates;
  calculate an interframe distance between frames from which the objects are detected;
  select an object identity probability from a previously-stored correspondence table of interframe distances and object identity probabilities based on the interframe distance calculated; and
  determine identity of the objects by comparing the object identity probability with a threshold,
  wherein the determined identity of the objects is updated when a new frame having a detected object is processed, the determined identity is based on a first group of frames, the update being based on frames including at least part of the first group of frames and the new frame, and wherein when a result of the determined identity based on the first group of frames is not consistent with a result of a determined identity of the objects based on the at least part of the first group of frames and the new frame, the update includes replacing the result of the determined identity based on the first group of frames with the result of the determined identity based on the at least part of the first group of frames and the new frame.

41. The identity determining computer program product according to claim 40, wherein the identity determining computer program product, which when executed by the computer further causes the computer to determine identity between objects included in a pair of frames by using similarity that is based on image features or sound features of the objects or a combination thereof aside from the object identity probability.

42. The identity determining computer program product according to claim 39, wherein the identity determining computer program product, which when executed by the computer further causes the computer to determine identity between objects included in a pair of frames by using a product which is obtained by multiplying the object identity probability and similarity that is based on image features or sound features of the objects or a combination thereof.

43. The identity determining computer program product according to claim 39, wherein the interframe distance is a medium time calculated based on a difference between frame numbers.

44. The identity determining computer program product according to claim 39, wherein the interframe distance is a scenario time calculated based on a difference between times on a script to which the frames correspond.

45. The identity determining computer program product according to claim 43, wherein the interframe distance is a medium time that is weighted based on any one or a combination of a shot change, a camerawork change, a scene change, a BGM change, and a change in an image feature of a background.

46. The identity determining computer program product according to claim 39, wherein the objects are a part of each frame.

47. The identity determining computer program product according to claim 39, wherein the objects are persons.

48. The identity determining computer program product according to claim 47, wherein an object identity probability between a plurality of persons detected from the same frame is 0.

49. The identity determining computer program product according to claim 39, wherein identity between the plurality of objects detected from the input video is determined by using an object identity probability determined based on the interframe distance and an inter-coordinate distance, the interframe distance being a distance between the frames from which the respective objects are detected, the inter-coordinate distance being a distance between position coordinates of the objects on the respective frames.

50. The identity determining computer program product according to claim 49, wherein the identity determining computer program product, which when executed by the computer further causes the computer to:
  detect a plurality of objects from an input video by using pattern recognition techniques with templates;
  calculate an interframe distance between frames from which the objects are detected;
  calculate an inter-coordinate distance between objects detected;
  calculate an object identity probability by using the interframe distance and the inter-coordinate distance and an object identity probability calculating function, the object identity probability calculating function being preliminarily set on a basis of a scenario of the input video; and determine identity of the objects based on the object identity probability.

51. The identity determining computer program product according to claim 49, wherein the identity determining computer program product, which when executed by the computer further causes the computer to:

detect a plurality of objects from an input video by using pattern recognition techniques with templates;

calculate an interframe distance between frames from which the objects are detected;

calculate an inter-coordinate distance between objects detected;

select an object identity probability from a previously-stored correspondence table of interframe distances, inter-coordinate distances, and object identity probabilities based on the interframe distance calculated and the inter-coordinate distance calculated; and determine identity of the objects based on the object identity probability.

52. The identity determining computer program product according to claim 50, wherein the identity determining computer program product, which when executed by the computer further causes the computer to determine identity between objects included in a pair of frames by using similarity that is based on image features or sound features of the objects or a combination thereof aside from the object identity probability.

53. The identity determining computer program product according to claim 50, wherein the identity determining computer program product, which when executed by the computer further causes the computer to determine identity between objects included in a pair of frames by using a product of the object identity probability and similarity that is based on image features or sound features of the objects or a combination thereof.

54. The identity determining computer program product according to claim 49, wherein the inter-coordinate distance is a distance calculated between coordinates corresponding to barycenters of image areas of the respective objects.

55. The identity determining computer program product according to claim 49, wherein the inter-coordinate distance is a distance calculated as to one or a plurality of feature points in an image area of a first object of the plurality of objects and one or a plurality of feature points in an image area of a second object of the plurality of objects, through a linear operation between coordinates of the respective corresponding feature points.

56. The identity determining computer program product according to claim 49, wherein the objects are faces of persons.

57. The identity determining computer program product according to claim 49, wherein the inter-coordinate distance is a distance calculated through a linear operation between position coordinates of both eyes in either one of a pair of frames and position coordinates of both eyes in the other frame.

58. The identity determination apparatus according to claim 6, wherein the interframe distance is a scenario time that is weighted based on any one or a combination of a shot change, a camerawork change, a scene change, a BGM change, and a change in an image feature of a background.

59. The identity determination method according to claim 25, wherein the interframe distance is a scenario time that is weighted based on any one or a combination of a shot change, a camerawork change, a scene change, a BGM change, and a change in an image feature of a background.

60. The identity determining computer program product according to claim 44, wherein the interframe distance is a scenario time that is weighted based on any one or a combination of a shot change, a camerawork change, a scene change, a BGM change, and a change in an image feature of a background.

61. The identity determination apparatus according to claim 1, wherein the relationship between the interframe distance and the object identity probability is based on an object identity probability calculating function.

* * * * *